United States Patent
Kakino

(10) Patent No.: US 10,112,414 B2
(45) Date of Patent: Oct. 30, 2018

(54) IMAGE RECORDING METHOD AND IMAGE RECORDED ARTICLE

(71) Applicant: FUJIFILM CORPORATION, Minato-ku, Tokyo (JP)

(72) Inventor: Ryuki Kakino, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 15/468,139

(22) Filed: Mar. 24, 2017

(65) Prior Publication Data

US 2017/0190188 A1    Jul. 6, 2017

Related U.S. Application Data

(63) Continuation of application No. PCT/JP2015/080582, filed on Oct. 29, 2015.

(30) Foreign Application Priority Data

Nov. 5, 2014 (JP) ................................. 2014-225616
May 21, 2015 (JP) ................................. 2015-103945

(51) Int. Cl.
| | |
|---|---|
| *B41J 2/01* | (2006.01) |
| *B41J 11/00* | (2006.01) |
| *B41M 5/52* | (2006.01) |
| *C09D 11/30* | (2014.01) |
| *C09D 11/322* | (2014.01) |
| *D06M 10/00* | (2006.01) |
| *B41M 5/00* | (2006.01) |

(52) U.S. Cl.
CPC ............. *B41J 11/002* (2013.01); *B41J 2/01* (2013.01); *B41M 5/0011* (2013.01); *B41M 5/0047* (2013.01); *B41M 5/0064* (2013.01); *B41M 5/52* (2013.01); *C09D 11/30* (2013.01); *C09D 11/322* (2013.01); *D06M 10/00* (2013.01)

(58) Field of Classification Search
CPC .......... B41J 2/01; C09D 11/30; C09D 11/322; B41M 5/00; B41M 5/50; B41M 5/52; D06M 10/00

USPC ........................................ 347/100, 102, 103
See application file for complete search history.

(56) References Cited

U.S. PATENT DOCUMENTS

| | | | |
|---|---|---|---|
| 7,527,695 B2* | 5/2009 | Ikuta | H01L 21/67028 134/1 |
| 8,673,431 B2* | 3/2014 | Mochizuki | C09D 11/101 347/37 |
| 2014/0036010 A1* | 2/2014 | Hasegawa | C09D 11/102 347/86 |

FOREIGN PATENT DOCUMENTS

| | | |
|---|---|---|
| JP | 2008-538219 A | 10/2008 |
| JP | 2011-246632 A | 12/2011 |
| JP | 2013-075385 A | 4/2013 |
| JP | 2013-527267 A | 6/2013 |

OTHER PUBLICATIONS

International Search Report issued in International Application No. PCT/JP2015/080582 on Nov. 24, 2015.
Written Opinion of the ISA issued in International Application No. PCT/JP2015/080582 on Nov. 24, 2015.
Extended European Search Report dated Sep. 27, 2017, issued in corresponding EP Patent Application No. 15857456.6.

* cited by examiner

*Primary Examiner* — An Do
(74) *Attorney, Agent, or Firm* — SOLARIS Intellectual Property Group, PLLC

(57) ABSTRACT

Provided are an image recording method including: subjecting a recording substrate to a surface treatment by irradiating an image recording surface of the recording substrate with light from excimer emission using a xenon gas, the recording substrate being an aggregate of non-absorbent or low-absorbent fiber materials; and applying an ink composition by an ink jet method onto the image recording surface of the recording substrate after the surface treatment; and an image recorded article.

12 Claims, No Drawings

IMAGE RECORDING METHOD AND IMAGE RECORDED ARTICLE

CROSS-REFERENCE TO RELATED APPLICATIONS

This application is a continuation application of International Application No. PCT/JP2015/080582, filed Oct. 29, 2015, the disclosure of which is incorporated herein by reference in its entirety. Further, this application claims priority from Japanese Patent Application No. 2014-225616, filed Nov. 5, 2014, and Japanese Patent Application No. 2015-103945, filed May 21, 2015, the disclosures of which are incorporated herein by reference in their entirety.

BACKGROUND OF THE INVENTION

1. Field of the Invention

The present invention relates to an image recording method and an image recorded article.

2. Description of the Related Art

Recently, an image recording method using an ink jet method has been widely used since it is capable of recording an image at a high speed; recording a high-quality image on a variety of recording media; and the like.

In a case of recording an image using an ink jet method, the durability and texture of the recorded image is one of the important properties from the viewpoint of quality.

Attempts have been made to improve rub resistance among the properties indicating the durability of an image. For example, an ink for ink jet recording, including a urethane-based resin and a pigment, has been disclosed as an ink composition for textiles (see, for example, JP2011-246632A).

Furthermore, an composition for printing on a wide-format substrate and a textile, including a pigment and a urethane-based resin, which is an aqueous ink composition for ink jet, with the urethane-based resin including alicyclic isocyanate formed by a specific method, is disclosed (see, for example, JP2013-527267A).

On the other hand, in ink jet recording on a non-woven fabrics for use in sanitary items such as paper diapers, that is, a recording substrate which is an aggregate of non-absorbent or low-absorbent fiber materials, an ink jet recording method in which an image having little bleeding and excellent rub resistance by subjecting a non-woven fabric in advance to a surface treatment such as a corona treatment in order to improve the adhesiveness to an ink composition, and then restricting the ink size so as to perform recording by an ink jet method is disclosed (see, for example, JP2013-075385A).

In addition, an aqueous polyurethane dispersion which has a specific structure and is capable of radiation curing is disclosed (see, for example, JP2008-538219A).

SUMMARY OF THE INVENTION

According to the method described in the above publications, with respect to substrates which clearly do not require a treatment in a thickness direction of a film or the like, an effect of improving rub resistance is exhibited.

On the other hand, substrates such as non-woven fabrics are aggregates with a low fiber density, unlike a paper, a film, or the like, and thus, in the formation of an ink image on the substrates, it is necessary that an ink be strongly held in fibers, not only on its surface but also in the thickness direction. However, the methods described in JP2011-246632A and JP2013-527267A are not methods in which a recording substrate is subjected to a surface treatment in advance, but methods in which an ink image is simply formed on the surface of a substrate. For the methods described in these documents, since an ink to be applied is difficult to closely adhere to the surface of a substrate and the fibers present in the deep portion in a recording substrate such as a non-woven fabric, it is expected that an ink image having rub resistance is not obtained. Further, in the method described in JP2013-075385A, improvement of rub resistance is observed for an image after the application of an ink by subjecting a substrate before the application of the ink to a corona treatment. However, in the corona treatment, since the treatment cannot be effected into the inside of the recording substrate which is a fibrous aggregate such as a non-woven fabric, there is a lack of the adhesiveness to the ink composition and the substrate in the thickness direction of the recording substrate, and thus, sufficient rub resistance cannot be obtained. Further, there is a concern that the corona treatment may damage the surface of the recording substrate. In addition, by an ultraviolet ray (UV) curing treatment by means of a metal halide mercury lamp after the application of an ink, shown in Examples of JP2008-538219A, satisfactory rub resistance and texture are not obtained.

Therefore, with regard to a recording substrate which is a fibrous aggregate such as a non-woven fabric, a technique for making an ink closely adhere to a recording substrate, not only on its surface but also in the thickness direction, is desired.

An embodiment of the present invention has an object to provide an image recording method in which an image having excellent rub resistance and texture is obtained in a case of using a recording substrate which is an aggregate of non-absorbent or low-absorbent fiber materials.

Furthermore, another embodiment of the present invention has an object to provide an image recorded article having excellent rub resistance and texture, using a recording substrate which is an aggregate of non-absorbent or low-absorbent fiber materials.

Specific means for achieving the objects include the following aspects.

<1> An image recording method comprising:

subjecting a recording substrate to a surface treatment by irradiating an image recording surface of the recording substrate with light from excimer emission using a xenon gas, the recording substrate comprising an aggregate of non-absorbent or low-absorbent fiber materials; and applying an ink composition by an ink jet method onto the image recording surface of the recording substrate after the surface treatment.

<2> The image recording method as described in <1>, in which the fiber materials comprise at least one selected from polypropylene fibers and polyethylene fibers.

<3> The image recording method as described in <1> or <2>, in which the aggregate is a non-woven fabric.

<4> The image recording method as described in any one of <1> to <3>, in which an irradiation intensity of the light is 30 mW/cm² to 300 mW/cm².

<5> The image recording method as described in any one of <1> to <4>, in which irradiation time of the light is 0.1 seconds to 10 seconds.

<6> The image recording method as described in any one of <1> to <5>, in which the ink composition comprises a color material and water.

<7> The image recording method as described in <6>, in which the color material comprises a pigment.

<8> The image recording method as described in any one of <1> to <7>, in which the ink composition further comprises particles of a urethane-based resin.

<9> The image recording method as described in <8>, in which the urethane-based resin comprises an organic salt having an organic cation as a counter ion.

<10> The image recording method as described in <9>, in which the organic salt comprises a triethylamine salt having a triethylamine cation as a counter ion.

<11> The image recording method as described in any one of <8> to <10>, in which the urethane-based resin comprises a structure derived from a diisocyanate compound, a structure derived from a diol compound, and a structure derived from an organic salt of a carboxyl group-containing diol compound.

<12> The image recording method as described in <11>, in which the diol compound comprises a diol polycarbonate.

<13> The image recording method as described in <11> or <12>, in which the diol compound has a molecular weight of from 500 to 20,000.

<14> The image recording method as described in any one of <8> to <13>, in which the urethane-based resin has an acid value of from 10 mmol/g to 200 mmol/g.

<15> An image recorded article, obtained by being recorded by the image recording method as described in any one of <1> to <14>.

According to an embodiment of the present invention, an image recording method in which an image having excellent rub resistance and texture is obtained in a case of using a recording substrate which is an aggregate of non-absorbent or low-absorbent fiber materials is provided.

Furthermore, according to another embodiment of the present invention, an image recorded article having excellent rub resistance and texture is provided, using a recording substrate which is an aggregate of non-absorbent or low-absorbent fiber materials.

DESCRIPTION OF THE PREFERRED EMBODIMENTS

<<Image Recording Method>>

The image recording method of the present disclosure is an image recording method including a surface treatment step of subjecting a recording substrate which is an aggregate of non-absorbent or low-absorbent fiber materials to a surface treatment by irradiating the image recording surface of the recording substrate with light from excimer emission using a xenon gas, and an ink application step of applying an ink composition onto the image recording surface of the surface-treated recording substrate by an ink jet method.

In the image recording method of the present disclosure, in an ink image recording method for recording an ink image on a recording substrate such as a non-woven fabric, an ink image having rub resistance and texture, which could not be obtained in pretreatments such as a corona treatment and a treatment using a metal halide mercury lamp, by providing a surface treatment step by means of an excimer lamp using a xenon gas before the application of an ink is obtained.

Furthermore, in the present specification, the "texture" is a texture felt when a recording substrate (particularly a non-woven fabric) including an image recorded by the application of an ink is touched with a finger, and when it is smooth, the effect of the texture is evaluated to be high.

The details of a mechanism by which a pretreatment by means of an excimer lamp improves the image recording on a recording substrate are not clear, but are presumed to be as follows by the present inventors.

In the surface treatment step in the present disclosure, modification of the fiber surface of the recording substrate is performed. It is thought that in excimer emission using a xenon gas, light reaches not only the surface of the image recorded side of the recording substrate, but also from the surface to the deep portion (the inside of the substrate). Accordingly, it is thought that since oxygen radicals generated by the decomposition of oxygen in the air through the irradiation with light exist not only on the surface but also the inside of the recording substrate, the surface of the fibers on the surface of the recording substrate and the fibers in the inside is changed into hydrophilicity. Due to a fact that the surfaces of the fibers on the surface of the recording substrate and the fibers in the inside are changed into hydrophilicity, it is thought that even when the ink applied after such a change infiltrates from the surface of the recording substrate to the lower part, it can adhere to the fibers closely, and as a result, an image that is difficult to be delaminated is recorded.

The excimer lamp using a xenon gas has a single wavelength with a maximum intensity at 172 nm. By the light of the excimer lamp, oxygen in the air efficiently decomposes to generate radicals.

In contrast, the metal halide mercury lamp has a wavelength with maximum intensities at 185 nm and 254 nm. Since it is more difficult for the light of the metal halide mercury lamp to generate oxygen radicals, as compared with the light of the excimer lamp, it is thought that a surface treatment by a metal halide mercury lamp is insufficient for the recording substrate such as a non-woven fabric. Further, in a treatment method using corona discharge, oxygen radicals by the discharge can be generated only on the surface of the recording substrate, while the oxygen radicals are difficult to be generated in the thickness direction of the recording substrate. Further, in the corona discharge, the energy to be applied onto the recording substrate is intense, and thus, there is a concern that there is damage on the surface of the recording substrate, as compared with a method using an excimer lamp.

From the above aspects, the recording substrate which has been pretreated with light irradiation from excimer emission by a xenon gas does not limit the jet form of an ink (for example, a dot size) as described in JP2013-075385A mentioned above, and makes an image having a texture and excellent rub resistance recorded.

The "rub resistance" as described herein means the durability of an image in a case of rubbing the surface of the image formed on a substrate.

Hereinafter, the image recording method of the present disclosure will be described in detail.

Furthermore, a composition of an ink for use in image recording may be simply referred to an "ink" in some cases. Further, an aggregation of components in an ink composition may be referred to as an "aggregation of an ink (composition)" in some cases.

In the present specification, a numerical range expressed using "to" means a range that includes the preceding and succeeding numerical values of "to" as the lower limit value and the upper limit value, respectively.

In the present specification, the amounts of the respective components in the ink composition mean a total amount of a plurality of materials present in the ink composition unless not specifically described in a case where a plurality of the materials corresponding to the respective components in the ink composition are present.

[Surface Treatment Step]

The image recording method of the present disclosure includes a surface treatment step of subjecting a recording substrate which is an aggregate of non-absorbent or low-absorbent fiber materials to a surface treatment by irradiating the image recording surface of the recording substrate with light from excimer emission using a xenon gas. The surface treatment refers to modification of the surface by irradiation of light from excimer emission for a certain period of time. The surface refers to a plane of the side on which an image is recorded in the recording substrate.

<Recording Substrate>

In the image recording method of the present disclosure, an image is recorded using a recording substrate which is an aggregate of non-absorbent or low-absorbent fiber materials. The recording substrate refers to a recorded article on which an image is recorded by an ink jet method.

The non-absorptivity or low-absorptivity of the recording substrate represents a degree to which the recording substrate absorbs an ink composition and can be evaluated as follows.

In the present specification, "the non-absorbent fiber" means a fiber having a water absorptivity (measurement conditions: 24 hr. Immersed in water) of less than 0.2% by mass according to ASTM D570 of an ASTM test method, and "the low-absorbent fiber" means a fiber having a water absorptivity (measurement conditions: 24 hr., immersed in water) of 0.2% by mass or more and less than 0.5% by mass according to ASTM D570 of an ASTM test method.

Examples of the non-absorbent or low-absorbent fiber materials for the ink composition include polyolefin fibers (fibers of polypropylene, polyethylene, and the like), polyester fibers (fibers of polyethylene terephthalate, polyethylene naphthalate, and the like), synthetic fibers such as aramid fibers, cellulose fibers, nylon fibers, vinylon fibers, and rayon fibers, metal fibers such as stainless steel, iron, gold, silver, and aluminum and glass fibers (glass wool and the like).

Among these, as the non-absorbent or low-absorbent fiber materials, from the viewpoint of low weights, polyolefin fibers are preferable, and at least one selected from polypropylene fibers and polyethylene fibers is more preferable.

Examples of the aggregate of the non-absorbent or low-absorbent fiber materials include a non-woven fabric, a woven fabric, and glass wool.

The non-woven fabric refers to a sheet-like material obtained by entangling fibers together, not weaving the fibers, and includes a hydroentangled non-woven fabric. The non-woven fabric is a manufactured sheet, web, or batt of directionally or randomly oriented fibers, fixed by friction, pressure-sensitive adhesive, adhesive, or the like. The non-woven fabric does not include products which are woven, knitted, tufted, stitch-bonded incorporating binding yarns or filaments, or felt-processed by wet milling.

As the aggregate of the non-absorbent or low-absorbent fiber materials, among those, the non-woven fabric is preferable, and the non-woven fabric of a polyolefin fiber is more preferable, from the viewpoints of low cost, superior workability, relatively low rub resistance of an image, and easy occurrence of bleeding.

For the recording substrate in the present disclosure, the diameter (fiber diameter) of a cross-section of fiber that constitutes the recording substrate, perpendicular to an axial direction of the fiber, is preferably 1 μm to 200 μm, more preferably 1 μm to 100 μm, and still particularly preferably 5 μm to 60 μM. If the fiber diameter is 1 μm or more, there are advantageous effects in terms of the rub resistance of an image. If the fiber diameter is 200 μm or less, there are advantageous effects in terms of the bleeding of an image and the texture of a recording substrate.

In addition, the thickness of the recording substrate is preferably 1 μm to 2,000 μm, more preferably 1 μm to 1,600 μm, and still more preferably 5 μm to 1,000 μm. If the thickness of the recording substrate is 1 μm or more, there are advantageous effects in terms of the flexibility, the repulsion force, and the elasticity, obtained by touching the recording substrate itself. If the thickness of the recording substrate is 2,000 μm or less, there are advantageous effects in terms of not only the rub resistance but also the texture of the recording substrate itself.

The density thereof (the density of a fiber surface) of the recording substrate is an aggregate of the fiber materials is preferably 1 $g/m^2$ to 300 $g/m^2$, more preferably 1 $g/m^2$ to 200 $g/m^2$, and particularly preferably 5 $g/m^2$ to 100 $g/m^2$. If the density of a fiber surface is 1 $g/m^2$ or more, there are advantageous effects from the viewpoint of easily obtaining an image density. If the density of a fiber surface is 300 $g/m^2$ or less, there are advantageous effects from the viewpoints of the rub resistance of an image.

In addition, the density of a fiber surface refers to a ratio [unit:$g/m^2$] of the amount of fibers, which are two-dimensionally arranged on a surface, to the area of the surface and is a value obtained by cutting the recording substrate into a unit area and measuring the mass thereof.

The recording substrate (for example, a non-woven fabric) may be a recording substrate manufactured by any methods such as melt blowing, spun bonding, solvent spinning, electrospinning, and carding.

The recording substrate in the present disclosure is subjected to a surface treatment by an excimer lamp using a xenon gas. The recording substrate is hydrophilicized by performing the surface treatment, and thus, in a case where an ink is prepared into a water-based ink, when an ink is applied onto a recording substrate, a phenomenon (cissing) that the ink is not applied onto the recording substrate is prevented, and thus the ink can be applied over the fiber on the surface of the recording substrate as well as on the fiber of the deep portion, resulting in adherence.

The surface tension of the recording substrate is preferably $3.4 \times 10^{-6}$ $J/m^2$ to $4.5 \times 10^{-6}$ $J/m^2$ (34 dyn/cm to 45 dyn/cm), more preferably $3.5 \times 10^{-6}$ $J/m^2$ to $4.0 \times 10^{-6}$ $J/m^2$ (35 dyn/cm to 40 dyn/cm). If the surface tension of the recording substrate is not too low, the adhesiveness of an image can be maintained, whereas if the surface tension of the recording substrate is not too high, the texture of the recording substrate itself is easily maintained.

Furthermore, the surface tension of the recording substrate is measured using a wetting tension test mixed liquid (manufactured by Wako Pure Chemical Industries Ltd.), and the number of a mixed liquid which starts to wet the recording substrate can be set as a surface tension of the recording substrate.

The surface tension of the ink is preferably in a range of 20 mN/m to 40 mN/m, and the range can be appropriately selected so as to adjust the average length of the ink to be applied in the axial direction of the fibers which will be described later. The surface tension of the ink is measured according to a Wilhelmy method using a static surface tensiometer (for example, TD3 manufactured by Ikeda Scientific Co., Ltd.).

<Irradiation with Light from Excimer Emission>

The image recording method of the present disclosure includes a surface treatment step of subjecting a recording substrate to a surface treatment by irradiating the image recording surface of the recording substrate with light from excimer emission as a pretreatment step for applying the ink.

The irradiation with light method is not particularly limited in terms of the embodiment as long as it is a method capable of irradiating the recording substrate with light from excimer emission using a xenon gas.

The "light from excimer emission using a xenon gas" refers to light having a wavelength having a maximum light emitting intensity at 172 nm, which is generated by discharge caused by applying a voltage to a xenon gas charged as a discharge gas. Accordingly, since the wavelength varies in the excimer emission using an argon gas or krypton gas which is generally used, in addition to a xenon gas, with respect to, for example, a recording substrate having the same thickness as the non-woven fabric, the treatment by irradiation with light becomes insufficient.

In the image recording method of the present disclosure, ones available as an excimer lamp can be used as a light source to be used, and in particular, an RF discharge type excimer lamp L12431 (manufactured by HAMAMATSU PHOTONICS K. K.) is suitable.

The condition for irradiation with light from excimer emission is not particularly limited, but the irradiation intensity can be selected from a range of 5 mW/cm$^2$ to 500 mW/cm$^2$, and is preferably 30 mW/cm$^2$ to 300 mW/cm$^2$, and more preferably 40 mW/cm$^2$ to 100 mW/cm$^2$.

The irradiation time can be selected from a range of 0.01 seconds to 30 seconds, and is preferably 0.1 seconds to 10 seconds, and more preferably 0.1 seconds to 5 seconds.

The distance (irradiation distance) between the excimer lamp and the substrate is preferably 5 mm or less, and more preferably 3 mm or less.

[Ink Application Step]

The image recording method of the present disclosure includes an ink application step of applying an ink composition onto the surface-treated surface of the recording substrate by an ink jet method after the surface treatment step. The details of the ink application step will be described.

The application of an ink onto a recording substrate in the present disclosure is carried out by an ink jet method. By carrying out the application of an ink onto a recording substrate by an ink jet method, the ink is selectively applied onto desired regions. The ink jet method is not particularly limited, and may be any one of an electric charge control method of using electrostatic attraction force to discharge an ink, a drop-on-demand method (pressure pulse method) of using a vibration pressure of a piezoelectric element, an acoustic ink jet method of converting signals into acoustic beams, irradiating an ink with the acoustic beams, and discharging the ink using radiation pressure, and a thermal ink jet (BUBBLE JET (registered trademark)) method of heating an ink to form foams, and using a generated pressure thereof may be used.

In a case where the ink is applied onto the recording substrate, the application method may be either a multi-pass mode or a 1-pass mode, but a 1-pass or 2-pass mode is preferable from the viewpoint of high-speed recording. The "1-pass" mode as described herein is an ink application method in which all the dots formed in a scanning region are recorded by performing scanning once. In this 1-pass mode, a discharge head (a line head in which recording elements are arranged) having a length corresponding to a width of a substrate is provided in a width direction of the substrate intersecting a transport direction in which the recording substrate is transported during recording. The ink is discharged from multiple discharge holes, which are provided in the discharge head, at the same time in the arrangement direction of elements. This 1-pass ink application mode is referred to as a so-called line method. Recording of an image is performed on the entire surface of a recording substrate by transporting the recording medium in a direction intersecting an arrangement direction of recording elements. In the line method, a transport system such as a carriage, which is required in a shuttle method for recording while scanning a short serial head in a width direction (main scanning direction) of a recording substrate, is unnecessary. In addition, the 2-pass mode is an ink application method in which dots discharged in a scanning region are recorded by performing scanning twice.

For example, the resolution per each color is preferably 100 dpi (dot per inch) or more, and from the viewpoint of a high-quality image, is preferably 200 dpi or more.

The viscosity (at 30° C.) of the ink is preferably 4 mPa·s to 20 mPa·s, and more preferably 6 mPa·s to 16 mPa·s, from the viewpoint of stably supplying the ink from an ink tank to a recording head.

In addition, the viscosity of the ink is a value determined by VISCOMETER TV-22 (manufactured by TOKISANGYO CO. LTD.) under a condition of 30° C.

The amount of the ink droplets to be discharged is not particularly limited as long as it falls within a range that can satisfy the determined rub resistance and the texture of an image portion, but the amount is preferably in a range of 1 pL (picoliter) to 150 pL, more preferably in a range of 2 pL to 120 pL, and still more preferably in a range of 60 pL to 120 pL.

In the image recording method of the present disclosure, it is preferable that during and/or after applying the ink by an ink jet method, a drying step of drying the ink applied onto the recording substrate is provided. That is, it is preferable that an image recorded article obtained by the image recording method of the present disclosure has an ink image formed thereon through the drying treatment during and/or after recording the image on the recording substrate. By further providing the drying step, the evaporation of a liquid medium (specifically, water, a water-soluble organic solvent, or the like) in the ink is accelerated, and thus, the ink that adheres on the fibers on the surface of the recording substrate as well as the internal fibers is fixed. As a result, a high-quality image which has excellent rub resistance and little image unevenness and bleeding can be obtained in a short period of time. In addition, during drying, heating accelerates coalescence of the polymer particles included in the ink, a good coating film is formed, and thus, the rub resistance of the recorded material is further improved.

The drying temperature during drying is not particularly limited as long as it is within a range that can evaporate the liquid medium present in the ink and can form a coating film in the peripheral portion of the ink, and the drying temperature is preferably 40° C. or higher from the above-described viewpoints. Among these, the drying temperature is preferably from 40° C. to 150° C., and more preferably from 40° C. to 80° C. When the temperature is 150° C. or lower, and furthermore 80° C. or lower, deformation or the like the recording substrate can be prevented.

Furthermore, the heating time during drying is not particularly limited as long as it can evaporate the liquid medium in the ink and can form a coating film in the peripheral portion of the ink, and can be appropriately selected in consideration of the kind of the liquid medium, the kind of the polymer, the recording speed, and the like.

A drying method is not particularly limited as long as it accelerates the volatilization of the liquid medium included in the ink. Examples of the drying method include a method of applying heat to the recording substrate before and after recording, a method of blowing the wind toward the recording substrate after recording, and a combination method thereof. Specific examples thereof include forced-air heating, radiation heating, conduction heating, high-frequency drying, microwave drying, and dry-air blowing.

Next, the ink for recording an image by the image recording method of the present disclosure will be described below in detail. In the image recording method of the present disclosure, it is preferable to use a water-based ink from the viewpoints of hydrophilicizing the recording substrate by performing a surface treatment, not inhibiting the operational environments during image recording, and others.

The aqueous ink landed on the recording substrate that has been discharged by an ink jet method and surface-treated quickly reduces a contact angle, and permeates into the deep portion of the recording substrate, and the aqueous ink is evenly distributed on the fiber present on the surface of the recording substrate as well as on the fiber in the thickness direction of the recording substrate.

The ink in the present disclosure preferably contains at least a color material and water. The ink in the present disclosure preferably contains polymer particles, and can be prepared by using components such as a pigment dispersant, a water-soluble organic solvent, a surfactant, and other additives, if desired.

(Color Material)

The ink in the present disclosure contains at least one kind of color material. As the color material, a pigment, a dye, or the like is suitable, and among these, a pigment is preferable from the viewpoints of the light resistance of an image, and the like. The pigment is not particularly limited and can be appropriately selected according to the purpose. For example, either an organic pigment or an inorganic pigment is available. As the pigment, a pigment which is substantially insoluble or insoluble in water is preferable from the viewpoint of ink colorability.

Examples of the organic pigment include polycyclic pigments such as an azo lake, an azo pigment, a phthalocyanine pigment, perylene and perinone pigments, an anthraquinone pigment, a quinacridone pigment, a dioxazine pigment, a diketo-pyrrolo-pyrrole pigment, a thioindigo pigment, an isoindolinone pigment, and a quinophthalone pigment; dye lakes such as basic dye type lake and an acidic dye type lake; and nitro pigments, nitroso pigments, aniline black, and daylight fluorescent pigments. In addition, examples of the inorganic pigments include titanium oxides, iron oxide-based pigments, and carbon black-based pigments. Pigments which are not described in the color index are also available, and any pigments may be used as long as they are dispersible in a water phase.

In addition, as the pigment, a pigment obtained by treating surfaces of the pigment with a surfactant or a polymer dispersant, graft carbon, and the like can also be used.

As the pigment, among those, particularly, at least one selected from the group consisting of an azo pigment, a phthalocyanine pigment, an anthraquinone pigment, a quinacridone pigment, and a carbon black-based pigment is preferable.

~Dispersant~

The ink in the present disclosure can contain at least one kind of dispersant. As a dispersant for the pigment, either a polymer dispersant or a low-molecular-weight surfactant type dispersant may be used. In addition, as the polymer dispersant, either a water-soluble dispersant or a water-insoluble dispersant is available.

Furthermore, being "water-insoluble" described herein represents that the dissolution amount of a dispersant is 10 g or less in a case where the dispersant is dried at 105° C. for 2 hours and then dissolved in 100 g of water at 25° C. In contrast, being "water-soluble" represents that the dissolution amount is more than 10 g.

The low-molecular-weight surfactant type dispersant can stably disperse a pigment in a water solvent while maintaining the ink at a low viscosity. The low-molecular-weight surfactant type dispersant is a low-molecular-weight dispersant having a molecular weight of 2,000 or more. In addition, the molecular weight of the low-molecular-weight surfactant type dispersant is preferably 100 to 2,000, and more preferably 200 to 2,000.

The low-molecular-weight surfactant type dispersant has a structure having a hydrophilic group and a hydrophobic group. In addition, one or more hydrophilic groups and one or more hydrophobic groups each only have to be independently included in one molecule, and the low-molecular-weight surfactant type dispersant may include plural kinds of hydrophilic groups and hydrophobic groups. In addition, the low-molecular-weight surfactant type dispersant may appropriately have a linking group for linking the hydrophilic group and the hydrophobic group.

Examples of the hydrophilic group include anionic groups, cationic groups, nonionic groups, and betaines groups which are combinations thereof. Among these, as the hydrophilic group, the nonionic groups are preferable.

Any nonionic groups are available used as long as they have negative charge. As the nonionic group, at least one selected from a phosphoric acid group, a phosphonic acid group, a phosphinic acid group, a sulfuric acid group, a sulfonic acid group, a sulfinic acid group, or a carboxylic acid group is preferable, at least one selected from a phosphoric acid group or a carboxylic acid group is more preferable, and a carboxylic acid group is still more preferable.

Any cationic groups are available as long as they have positive charge, but an organic cationic substituent is preferable and a cationic group of nitrogen or phosphorus is more preferable. In addition, as the cationic group having nitrogen, at least one selected from a pyridinium group and an ammonium group is preferable.

Examples of the nonionic group include polyethylene oxide, polyglycerin, and parts of a sugar unit.

It is preferable that the hydrophobic group has, for example, a hydrocarbon-based, fluorocarbon-based, or silicone-based structure, and it is particularly preferable that the hydrophobic group has a hydrocarbon-based structure. In addition, the hydrophobic group may have a linear or branched structure. In addition, the hydrophobic group may have one or two or more chained structures. When two or more chained structures are used, the low-molecular-weight surfactant type dispersant may include plural kinds of hydrophobic groups.

In addition, as the hydrophobic group, a hydrocarbon group having 2 to 24 carbon atoms is preferable, a hydrocarbon group having 4 to 24 carbon atoms is more preferable, and a hydrocarbon group having 6 to 20 carbon atoms is still more preferable.

Among the polymer dispersants, examples of the water-soluble dispersant include hydrophilic polymer compounds.

Examples of natural hydrophilic polymer compounds include plant polymers such as gum arabic, tragacanth gum, guar gum, karaya gum, locust bean gum, arabinogalactan, pectin, and quince seed starch; seaweed-based polymers such as alginic acid, carrageenan, and agar; animal polymers such as gelatin, casein, albumin and collagen; and microbial polymers such as xanthen gum and dextran.

In addition, examples of hydrophilic polymer compounds obtained by chemically modifying natural raw materials include cellulose-based polymers such as methyl cellulose, ethyl cellulose, hydroxyethyl cellulose, hydroxypropyl cellulose, and carboxymethyl cellulose; starch-based polymers such as sodium starch glycolate, and sodium starch phosphate; and seaweed-based polymers such as sodium alginate and propylene glycol alginate.

Furthermore, examples of synthetic hydrophilic polymer compounds include vinyl polymers such as polyvinyl alcohol, polyvinyl pyrrolidone and polyvinyl methyl ether; acrylic resins such as non-crosslinked polyacrylamide, polyacrylic acid and alkali metal salts thereof, or water-soluble styrene acrylic resins; water-soluble styrene maleic acid resins; water-soluble vinylnaphthalene acrylic resins; water-soluble vinylnaphthalene maleic acid resins; polyvinyl pyrrolidone; polyvinyl alcohol; alkali metal salts of formalin condensates of β-naphthalene sulfonic acid; polymer compounds having, at a side chain, a salt of a cationic functional group such as a quaternary ammonium group or an amino group; and natural polymer compounds such as shellac.

Among these, as the water-soluble polymer dispersant, a polymer compound having a carboxyl group is preferable from the viewpoint of the dispersion stability of the pigment. Polymer compounds having a carboxyl group are particularly preferable, for example, acrylic resins (for example, water-soluble styrene acrylic resins), water-soluble styrene maleic acid resins, water-soluble vinylnaphthalene acrylic resins, and water-soluble vinylnaphthalene maleic acid resins.

Among the polymer dispersants, examples of the water-insoluble dispersants include polymers having both a hydrophobic moiety and a hydrophilic moiety. Examples of the water-soluble polymer dispersant include a styrene-(meth)acrylic acid copolymer, a styrene-(meth)acrylic acid-(meth)acrylic acid ester copolymer, a (meth)acrylic acid ester-(meth)acrylic acid copolymer, a polyethylene glycol (meth)acylate-(meth)acrylic acid copolymer, a vinyl acetate-maleic acid copolymer, and a styrene-maleic acid copolymer.

The weight-average molecular weight of the polymer dispersant is preferably 3,000 to 200,000, more preferably 5,000 to 100,000, still more preferably 5,000 to 80,000, and particularly preferably 10,000 to 60,000.

The polymer dispersant preferably includes a polymer having a carboxyl group from the viewpoint of self-dispersibility, more preferably includes a polymer having a carboxyl group and an acid value of 100 mgKOH/g or less, and still more preferably includes a polymer having a carboxyl group and an acid value of 25 mgKOH/g to 100 mgKOH/g. The acid value is a value determined in accordance with the method described in Japanese Industrial Standards (JIS K0070: 1992).

In addition, the mixing mass ratio of the pigment to the dispersant (pigment:dispersant) is preferably in a range of 1:0.06 to 1:3, more preferably in a range of 1:0.125 to 1:2, and still more preferably in a range of 1:0.125 to 1:1.5.

A dye may be used instead of the pigment. In a case where a dye is used, a dye which is supported on a water-insoluble carrier can be used. A well-known dye can be used without limitation as the dye, and dyes disclosed in JP2001-115066A, JP2001-335714A, JP2002-249677A, and the like are preferably used. The carrier can be selected among inorganic materials, organic materials, and composite materials thereof without limitation. Specifically, the carriers described in JP2001-181549A, JP2007-169418A, and the like are preferably used.

The carrier (water-insoluble particles) which supports the dye can be used with a dispersant as an aqueous dispersion. As the dispersant, the above-described dispersants can be suitably used.

In the image recording method of the present disclosure, from the viewpoints of the rub resistance, the quality, and the like of an image, it is preferable that the ink includes a pigment and a dispersant, and it is more preferable that the ink includes an organic pigment and a polymer dispersant, and the pigment is included as a water-soluble pigment having at least a part of pigment surfaces is coated with the polymer dispersant. Furthermore, it is particularly preferable that the aqueous ink includes an organic pigment and a polymer dispersant containing a carboxyl group as a water-dispersible pigment in which at least a part of surfaces of the pigment is coated with the polymer dispersant having a carboxyl group.

The average particle diameter of the pigment in the dispersion state is preferably 10 nm to 200 nm, more preferably 10 nm to 150 nm, and still more preferably 10 nm to 100 nm. When the average particle diameter is 200 nm or less, color reproducibility is improved and jetting properties when ink droplets are jet with an ink jet method are improved. When the average particle diameter is 10 nm or more, light resistance is improved. In addition, the particle size distribution of the color material is not particularly limited, and may be a wide particle size distribution or a monodispersed particle size distribution. In addition, a color material having a monodisperse particle size distribution may be used as a mixture of two or more kinds.

The average particle diameter of the pigment in the dispersion state as described herein represents an average particle diameter in a state where the ink is prepared, but the same shall be applied to a so-called concentrated ink dispersion which is the previous state to the state where the ink is prepared.

Furthermore, the average particle diameter of the pigment in the dispersion state, and the average particle diameter and the particle size distribution of the polymer particles which will be described later can be obtained by measuring the volume-average particle diameter according to a dynamic light scattering method, using a nanotrac particle size distribution measurement apparatus UPA-EX150 (manufactured by Nikkiso Co., Ltd.).

The pigments may be used singly or in combination of two or more kinds thereof.

The content of the pigment in the ink is preferably 1% by mass to 25% by mass, and more preferably 2% by mass to 15% by mass, with respect to the total amount of the ink, from the viewpoint of image density.

(Polymer Particles)

The ink in the present disclosure preferably contains at least one kind of polymer particles. When the ink contains the polymer particles, the adhesiveness of an ink to an image recording substrate and the rub resistance of an image can further be improved.

Examples of the polymer particles include particles of a thermoplastic, thermosetting, or modified acrylic resin, an epoxy-based resin, a urethane-based resin, an ether-based resin, an amide-based resin, an unsaturated ester-based resin, a phenolic resin, a silicone-based resin, a fluorine-based resin, a polyvinyl-based resin (for example, polyvinyl chloride, polyvinyl acetate, polyvinyl alcohol, and polyvinyl butyral), an alkyd resin, an ester-based resin (for example, a phthalic acid resin), an amino-based material (for example, a melamine resin, a melamine-formaldehyde resin, an amino-alkyd co-condensation resin, and a urea resin), and mixtures thereof.

As the polymer particles, the particles may be used in combination of two or more kinds thereof, or particles composed of polymers in which two or more kinds of polymers are mixed or bonded together may also be used.

Among these, as the polymer particles, particles of a least one kind of resin selected from acrylic resins, urethane-based resins, ether-based resins, ester-based resins, and olefin-based resins are preferable, and among these, particles of a least one kind of resin selected from acrylic resins and urethane-based resins are more preferable, and particles of a least one kind of resin selected from urethane-based resins are particularly preferable.

~Particles of Urethane-Based Resin~

As the polymer particles, particles of a urethane-based resin are particularly preferable from the viewpoints of further enhancing the continuous jetting property and the jetting stability of the ink, and enhancing the rub resistance of an image. The reason why the rub resistance is good in a case of using the urethane-based resin is speculated as follows. The surface of an excimer-treated substrate, a hydroxy group, a carboxyl group, and the like of fibers present inside, and a urethane-based resin in the ink form hydrogen bonds strongly or densely, thereby improving the adhesiveness of the whole ink composition to the fibers.

Moreover, the reason why the urethane-based resin is preferable is speculated as follows. That is, a urethane-based resin is formed of a urethane site capable of a strong interaction between polymers as in hydrogen bonds, and a non-urethane site having a relatively weak interaction between polymers. It is presumed that when a film of the ink is formed, the urethane-based resin have the sites having a relatively strong interaction and the sites having a relatively weak interaction respectively gather together to construct a sea-island structure as a microscopic structure, and urethane is presumed to have flexibility as a result of the construction of this sea-island structure. It is speculated that since the urethane-based resin intrinsically exhibits flexibility, polymer particles having a higher Tg, as compared with the polymer particles known in the related art, can be used, and can form an ink film (ink image) having flexibility and strength, and excellent rub resistance.

Therefore, the excimer treatment in the present disclosure make the adhered urethane molecules exhibit the above-described characteristics even in the thickness direction of the substrate, and thus, it is more advantageous for further improvement of rub resistance as well as improvement of texture.

The urethane-based resin is preferably a polymer having a structure derived from a diisocyanate compound and a structure derived from a diol compound.

In the image recording method of the present disclosure, a method for preparing the urethane-based resin is not particularly limited, but a method including subjecting a diisocyanate compound and a diol compound to urethanization in an organic solvent to prepare a urethane is preferable, and in addition, from the viewpoints of the water dispersibility of the ink and the affinity of the ink composition with the recording substrate, a method including subjecting a diisocyanate compound, a diol compound, and an organic salt of a diol compound containing a carboxyl group to urethanization in an organic solvent to prepare a urethane is more preferable. For the method for preparing the urethane-based resin, various known aliphatic, aromatic, or alicyclic diisocyanate compounds can be used.

Specific examples of the diisocyanate compound include aromatic diisocyanates such as 2,4-tolylene diisocyanate, 2,6-tolylene diisocyanate, 1,5-naphthylene diisocyanate, 4,4'-diphenyl methane diisocyanate, m-phenylene diisocyanate, xylylene diisocyanate, 4,4'-diphenyldimethyl methane diisocyanate, and 4,4'-dibenzyl isocyanate, and aliphatic or alicyclic diisocyanates such as tetramethylene diisocyanate, hexamethylene diisocyanate, 1,4-dicyclohexyl methane diisocyanate, and isophorone diisocyanate.

Specific examples of the diol compound include polyether compounds such as polyethylene glycol, polypropylene glycol, and polytetramethylene glycol, polyhydric alcohols such as ethylene glycol, propanediol, butanediol, pentanediol, hexanediol, neopentyldiol, and cyclohexanedimethanol, polyesters obtained by dehydration and condensation reactions with polyvalent carboxylic acids such as maleic acid, succinic acid, glutaric acid, adipic acid, sebacic acid, dodecane-dioic acid, terephthalic acid, isophthalic acid, and naphthalenedicarboxylic acid, or ring-opening polymerization reactions of cyclic esters such as caprolactone and pivalolactone, low-molecular-weight glycols such as diol polycarbonate and ethylene glycol, diethylene glycol, triethylene glycol, 1,2-propylene glycol, 1,3-propanediol, 1,3-butylene glycol, 1,4-butanediol, 1,6-hexanediol, ethylene oxide or propylene oxide adducts of hydrogenated bisphenol A, and ethylene oxide of bisphenol S, and polyethers such as polyethylene glycol, polypropylene glycol, and polytetramethylene glycol.

As the diol compound, diol compounds having at least one of a polyether structure, a polyester structure, and a polycarbonate structure are preferable.

As the diol compound in the present disclosure, a diol compound having a structure derived from diol polycarbonate is more preferable. The diol polycarbonate is also produced through a reaction such as a de-methanol condensation reaction of a polyhydric alcohol and dimethyl carbonate, a de-phenol condensation reaction of a polyhydric alcohol and diphenyl carbonate, and a de-ethylene glycol condensation reaction of a dialcohol and ethylene carbonate. Examples of a polyhydric alcohol which is used in such reactions include various saturated or unsaturated glycols such as 1,6-hexanediol, diethylene glycol, triethylene glycol, propylene glycol, 1,3-butanediol, 1,4-butanediol, neopentyl glycol, pentanediol, 3-methyl-1,5-pentanediol, octanediol, 1,4-butynediol, dipropylene glycol, tripropylene glycol, and polytetramethylene ether glycol; and alicyclic glycols such as 1,4-cyclohexane diglycol and 1,4-cyclohexanedimethanol.

Furthermore, other examples of the diol compound include polycaprolactone (polycaprolactonediol) which contains a hydroxyl group, a hydroxyl group-containing acrylic polymer, hydroxyl group-containing epoxide, polyhydroxypolyacetal, polyhydroxypolythioether, polysiloxanepolyol, ethoxylated polysiloxane polyol, polybutadiene polyol, hydrogenated polybutadiene polyol, polyisobutylene polyol, polyacrylate polyol, halogenated polyester, and halogenated polyether.

Among the above-mentioned diol compounds, polyethers such as diol polycarbonate, polycaprolactone which contains a hydroxyl group, low-molecular-weight glycol, polyethylene glycol, polypropylene glycol, and polytetramethylene glycol are preferable. At least one selected from the group consisting of diol polycarbonate, polycaprolactone which contains a hydroxyl group, polypropylene glycol, and polytetramethylene glycol is more preferable. Diol polycarbonate is particularly preferable.

The molecular weight (Mn) of the diol compound is preferably 200 to 25,000, more preferably 500 to 20,000, and the most preferably 500 to 2,000.

Moreover, the urethane-based resin may include a diol compound containing a carboxyl group in the constituents as a water-solubility imparting component. From the viewpoint of enhancing water dispersibility of the particles of a urethane-based resin, specific examples of the diol compound containing a carboxyl group include dimethylol propanoic acid (DMPA), dimethylol butanoic acid (DMBA), citric acid, tartaric acid, glycolic acid, lactic acid, malic acid, dihydroxymalic acid, and dihydroxytartaric acid, and a mixture thereof, each of which is a compound derived from hydroxycarboxylic acid.

Among these, at least one selected from dimethylol propanoic acid (DMPA) and dimethylol butanoic acid (DMBA) is preferable.

For the particles of a urethane-based resin, from the viewpoint of improving the dispersibility of the particles of a urethane-based resin, it is preferable to add a neutralizer which becomes a counter ion of the urethane-based resin in a solution, to afford a salt. The salt is not particularly limited, and examples thereof include inorganic salts and organic salts (for example, hydroxides or oxides of alkali metals or alkaline earth metals, carbonates or hydrocarbonates thereof, and ammonia or salts of primary, secondary, or tertiary amines). Among these, as the salt, an organic salt having an organic cation as a counter ion is preferable from the viewpoint of rub resistance. As the organic salt, an organic amine salt is preferable. Specific examples thereof include organic salts having a cation as a counter ion, such as trimethylamine, triethylamine, tripropylamine, tributylammonium, triethanolamine, monoethanolamine, N-methylmorpholine, morpholine, 2,2-dimethylmonoethanolamine, N,N-dimethylmonoethanolamine, pyridine, and dimethylaminopyridine. Among these, as the organic salt, an organic amine salt is preferable, a salt of at least one selected from the group consisting of triethylamine, pyridine, dimethylaminopyridine, and tributylammonium is more preferable, and a salt of triethylamine having a triethylamine cation as a counter ion is the most preferable.

It is preferable that the urethane-based resin in the present disclosure includes a structure derived from a diisocyanate compound, a structure derived from a diol compound, and a structure derived from an organic salt of a diol compound containing a carboxyl group, from the water dispersibility of an ink and the affinity of the ink composition with a recording substrate.

The acid value of the urethane-based resin is preferably 10 mmol/g to 200 mmol/g, more preferably 10 mmol/g to 100 mmol/g, and the most preferably 30 mmol/g to 80 mmol/g. When the acid value is 10 mmol/g or more, the dispersibility of the particles of a urethane-based resin can be enhanced, and when the acid value is 200 mmol/g or less, the rub resistance of the ink image can be improved.

Furthermore, the acid value is expressed in the number of moles of potassium hydroxide required for neutralizing one gram (g) of the resin particles. That is, the acid value is a value determined by the measurement method in accordance with JIS Standards (JIS K0070: 1992).

The weight-average molecular weight of the urethane-based resin is not particularly limited, but is preferably 10,000 to 200,000, more preferably 30,000 to 150,000, and still more preferably 50,000 to 120,000. By setting the weight-average molecular weight of the urethane-based resin to 10,000 or more, higher rub resistance can be obtained. Further, by setting the weight-average molecular weight of the urethane-based resin to 200,000 or less, higher flexibility can be obtained.

In addition, the weight-average molecular weight of the urethane-based resin is measured by gel permeation chromatography (GPC).

For example, an HLC (registered trademark)-8020GPC (manufactured by Tosoh Corporation) is used as a GPC, three columns of TSKgeL (registered trademark) Super Multipore HZ-H (manufactured by Tosoh Corporation, 4.6 mm ID×15 cm) are used as columns, and tetrahydrofuran (THF) is used as an eluent. Further, the conditions are such that the sample concentration is 0.45% by mass, the flow rate is 0.35 ml/min, the amount of a sample to be injected is 10 µl, the measurement temperature is 40° C., and a refractive index (RI) detector is used. In addition, a calibration curve is generated from eight samples of "reference sample TSK standard, polystyrene": "F-40", "F-20", "F-4", "F-1", "A-5000", "A-2500", "A-1000", and "n-propylbenzene", manufactured by Tosoh Corporation.

~Particles of Acrylic Resin~

As the particles of the acrylic resin, particles of the acrylic resin having an anionic group are the most preferable. The acrylic resin having an anionic group is obtained by, for example, the polymerization of an acryl monomer (anionic group-containing acryl monomers) having an anionic group, and if desired, other monomers capable of being copolymerized with anionic group-containing acryl monomers in a solvent. Examples of the anionic group-containing acryl monomer include acryl monomers having one or more groups selected from the group consisting of a carboxyl group, a sulfonic acid group, and a phosphonic acid, and among these, acryl monomers (acrylic acid, methacrylic acid, crotonic acid, ethacrylic acid, propylacrylic acid, isopropylacrylic acid, itaconic acid, fumaric acid, and the like) having an carboxyl group are preferable, and at least one selected from acrylic acid and methacrylic acid is particularly preferable.

~Particles of Other Resins~

The ink in the present disclosure may also include particles of polymers other than the above-mentioned urethane-based resins and acrylic resins. The polymers other than the urethane-based resins and acrylic resins can be selected from the polymers containing a carboxyl group and having an acid value of 25 mgKOH/g to 100 mgKOH/g, from the viewpoint of self-dispersibility which will be described later. Further, from the viewpoint of self-dispersibility, the acid value is more preferably 25 mgKOH/g to 80 mgKOH/g, and still more preferably 30 mgKOH/g to 65 mgKOH/g. When the acid value is 25 mgKOH/g or more, the stability of self-dispersibility is improved, and when the acid value is 100 mgKOH/g or less, it is advantageous in the water resistance of an image.

[Particles of Self-Dispersible Polymer]

Particles of a self-dispersible polymer having self-dispersibility are suitable as the polymer particles. Hereinafter, the particles of the self-dispersible polymer will be described.

The particles of the self-dispersible polymer mean particles of a water-insoluble polymer which can be in the state of dispersion in an aqueous medium by a functional group (in particular, an acidic group or a salt thereof) included in the polymer in a case where the particles are in the state of dispersion in the absence of a surfactant (in particular, the state of dispersion that is performed with a phase-transfer emulsification method), and do not contain a free surfactant.

The particles of the self-dispersible polymer are preferable from the viewpoint of jetting stability and liquid stability (in particular, dispersion stability) of a system including a pigment. Among these, particles of a self-dispersible polymer having a carboxyl group are more preferable.

The dispersion state as described herein encompasses both of an emulsion state where the water-insoluble polymer is dispersed in a liquid state in an aqueous medium (emulsion) and a dispersion state where the water-insoluble polymer is dispersed in a solid state in an aqueous medium (suspension).

It is preferable that the water-insoluble polymer in the present disclosure is a water-insoluble polymer which can be in the dispersion state where the water-insoluble polymer is dispersed in the solid state, from the viewpoint of fixability when a liquid composition is used.

Examples of a method of emulsifying or suspending the self-dispersible polymer, that is, a method of preparing an aqueous dispersion of the self-dispersible polymers include a phase-transfer emulsification method. Examples of the phase-transfer emulsification method include a method in which the self-dispersible polymer is dissolved or dispersed in a solvent (for example, a hydrophilic organic solvent); and the resultant is poured into water without adding a surfactant to neutralize a salt-producing group (for example, an acidic group) having a water-insoluble polymer, followed by stirring and mixing; and the solvent is removed, and then an aqueous dispersion in the emulsion or suspension state is obtained.

The dispersion state of the particles of the self-dispersible polymer is a state in which when a solution obtained by dissolving 30 g of a water-insoluble polymer in 70 g of an organic solvent (for example, methyl ethyl ketone), a neutralizer (when a salt-producing group is anionic, sodium hydroxide; when a salt-producing group is cationic, acetic acid) capable of 100% neutralizing a salt-producing group of the water-insoluble polymer, and 200 g of water are mixed and stirred (device: a stirrer equipped with a stirring blade, a rotation speed: 200 rpm, a stirring time: 30 minutes, and a stirring temperature: 25° C.), the dispersion state can be visually confirmed to be stably present at 25° C. for at least one week even after the removal of the organic solvent from the mixed liquid.

In addition, the water-insoluble polymer refers to a polymer which has a dissolution amount of 10 g or less when being dried at 105° C. for 2 hours and dissolved in 100 g of water at 25° C. The dissolution amount is preferably 5 g or less, and more preferably 1 g or less. The dissolution amount is a dissolution amount when a salt-producing group of the water-insoluble polymer is 100% neutralized by using sodium hydroxide or acetic acid according to the kind of the salt-producing group.

The aqueous medium is configured to include water, and may include a hydrophilic organic solvent, if desired. It is preferable that the aqueous medium includes water and a hydrophilic organic solvent having a content of 0.2% by mass or less with respect to water, and it is more preferable the aqueous medium includes only water.

A main chain skeleton of the water-insoluble polymer is not particularly limited, and vinyl polymers, and condensation type polymers (an epoxy resin, polyester, polyurethane, polyamide, cellulose, polyether, polyurea, polyimide, polycarbonate, and the like). Among these, the main chain skeleton of the water-insoluble polymer is particularly preferably at least one selected from a vinyl polymer and polyurethane.

Suitable examples of monomers constituting the condensation type polymer are described in JP2001-247787A. The polyurethane is synthesized by the polyaddition reaction of a diol compound and a diisocyanate compound as raw materials. For the details of the diol compound and the diisocyanate compound, reference can be made to the descriptions of paragraph Nos. [0031] to [0036] of JP2001-247787A.

In addition, suitable examples of the vinyl polymers and the monomers constituting the vinyl polymers include the monomers described in JP2001-181549A and JP2002-88294A. In addition, vinyl polymers can be used in which a dissociable group is incorporated into a terminal of the polymer chain by radical polymerization of vinyl monomers using a chain transfer agent or polymerization initiator having a dissociable group (or a substituent from which a dissociable group can be derived) and an iniferter or by ion polymerization of compounds using an initiator or a terminator which has a dissociable group (or a substituent from which a dissociable group can be derived).

A method of preparing the water-insoluble polymer constituting the polymer particles is not particularly limited. Examples thereof include a method of performing emulsion polymerization in the presence of a polymerizable surfactant to form a covalent bond between the polymerizable surfactant and the water-insoluble polymer; a method (solution polymerization method) of performing solution polymerization of a monomer mixture including a hydrophilic group-containing monomer and an aromatic group-containing monomer; and a method of performing copolymerization with a well-known polymerization method such as a bulk polymerization method. Among these polymerization methods, a solution polymerization method is preferable and a solution polymerization method using an organic solvent is more preferable, from the viewpoint of jetting stability in a case of using an ink composition.

It is preferable that the polymer particles contain a polymer synthesized in an organic solvent, the polymer has carboxyl groups, a part of or all the carboxyl groups of the polymer are neutralized, and the polymer particles are prepared as a polymer dispersion in which water is the continuous phase. That is, it is preferable that the preparation of the polymer particles in the present disclosure is carried out by providing a step of synthesizing a polymer in an organic solvent and a dispersion step of neutralizing at least a part of the carboxyl groups of the polymer to obtain an aqueous dispersion.

It is preferable that the dispersion step includes the following steps (1) and (2).

Step (1): a step of stirring a mixture containing the polymer (water-insoluble polymer), an organic solvent, a neutralizer, and an aqueous medium Step (2): a step of removing the organic solvent from the mixture.

It is preferable that the step (1) is a step of dissolving the polymer (the water-insoluble polymer) in an organic solvent, then gradually adding a neutralizer and an aqueous medium thereto, and mixing and stirring the mixture to obtain a dispersion. In this way, by adding a neutralizer and an aqueous medium to a water-insoluble polymer solution in which the water-insoluble polymer is dissolved in an organic solvent, the self-dispersible polymer particles with a particle diameter, which have good preservation stability, can be obtained without requiring a strong shearing force. A method of stirring the mixture is not particularly limited, and a mixing and stirring device which is generally used, and if desired, a disperser such as an ultrasonic disperser and a high-pressure homogenizer can be used.

Preferable examples of the organic solvent include alcohol-based solvents, ketone-based solvents, and ether-based solvents. For the details of the organic solvents, the descriptions in paragraph No. [0109] of JP2011-42150A can be applied. As the organic solvent, at least one selected from the group consisting of ketone-based solvents such as methyl ethyl ketone and alcohol-based solvents such as isopropyl alcohol is preferable, and a combination of isopropyl alcohol and methyl ethyl ketone is preferable from the viewpoint of alleviating a polarity change when the phase is transferred from water to oil. By using the combination of the solvents, aggregation settling and coalescence between particles do not occur and the self-dispersible polymer particles with fine particle diameters, which have good dispersion stability, can be obtained.

The neutralizer is used for neutralizing a part of or all the dissociable groups to form the emulsion state or suspension state in which the self-dispersible polymer is stable in water. When the self-dispersible polymer has an anionic dissociable group (for example, a carboxyl group) as a dissociable group, examples of the neutralizer to be used include basic compounds such as an organic amine compound, ammonia, and a hydroxide of alkali metal. For the details of the neutralizer, the descriptions in paragraph No. [0110] of JP2011-42150A can be applied. Among these, as the neutralizer, at least one selected from the group consisting of sodium hydroxide, potassium hydroxide, triethylamine, and triethanolamine is preferable from the viewpoints of the dispersion stability of the self-dispersible polymer particles in water.

It is preferable that the basic compound is used in a proportion of 5% by mole to 120% by mole with respect to 100% by mole of the dissociable group. The details of the ratio described herein are described in paragraph No. [0111] of JP2011-42150A.

In Step (2), the organic solvent is removed from the dispersion obtained in Step (1) with an ordinary method such as distillation under reduced pressure and the phase is transferred to water. As a result, the aqueous dispersion of the polymer particles can be obtained. The organic solvent in the obtained aqueous dispersion is substantially removed. The amount of the organic solvent is preferably 0.2% by mass or less, and more preferably 0.1% by mass or less, with respect to the total mass of the aqueous dispersion.

Regarding the average particle diameter of the polymer particles (in particular, the self-dispersible polymer particles), the volume-average particle diameter thereof is preferably in a range of 1 nm to 500 nm, more preferably in a range of 5 nm to 200 nm, still more preferably in a range of 10 nm to 100 nm, and particularly preferably in a range of 15 nm to 60 nm. When the average particle diameter is 1 nm or more, manufacturing suitability is improved. In addition, the particle size distribution of the polymer particles is not particularly limited, and the polymer particles may be either polymer particles having a wide particle size distribution or polymer particles having a monodispersed particle size distribution.

Furthermore, the average particle diameter and the particle size distribution of the polymer particles are determined by measuring the volume-average particle diameter by a dynamic light scattering method, using a nanotrac particle size distribution measurement apparatus UPA-EX150 (manufactured by Nikkiso Co., Ltd.).

The glass transition temperature (Tg) of the polymer particles is preferably 0° C. or higher, more preferably 10° C. or higher, and still more preferably 15° C. or higher, from the viewpoint of the preservation stability of the ink. In addition, Tg can be determined by differential scanning calorimetry (DSC), using DSC7020 (manufactured by Hitachi High-Tech Science Corporation).

The polymer particles (in particular, self-dispersible polymer particles) may be used singly or as a mixture of two or more kinds thereof.

The content of the polymer particles in the ink is preferably 10% by mass to 60% by mass, more preferably 15% by mass to 50% by mass, and particularly preferably 20% by mass to 40% by mass, with respect to the total amount of the ink, from the viewpoint of the rub resistance of an image.

(Water)

The ink in the present disclosure is preferably prepared to be in a water system including water, and the amount of water is not particularly limited. Among these, the amount of water is preferably from 5% by mass to 99% by mass, and more preferably from 10% by mass to 70% by mass, with respect to the total mass of the ink, in views of securing stability and ejection reliability.

(Lubricant)

The ink in the present disclosure can contain at least one kind of lubricant. If the ink in the present disclosure contains a lubricant, the friction coefficient of an image surface is reduced and the rub resistance of the image is further improved.

Any lubricants can be used without particular limitation as long as it has a function of reducing the friction coefficient of the image surface. Examples thereof include wax particles, ester compounds, silicone compounds, fluorine compounds, higher aliphatic acids or salts thereof, fatty acid amide compounds (preferably a carboxylic acid amide compound), and organic or inorganic matting agents.

Examples of the wax particles include particles of natural waxes and synthetic waxes.

Examples of the natural waxes include petroleum waxes, plant waxes, and animal waxes. Among these, examples of the petroleum waxes include paraffin wax, microcrystalline wax, and petrolatum. Examples of the plant waxes include carnauba wax, candelilla wax, rice wax, and Japanese wax, and examples of the animal/plant waxes include lanolin and beeswax.

Examples of the synthetic waxes include synthetic hydrocarbon-based waxes and modified waxes. Among these, examples of the synthetic hydrocarbon-based waxes include polyethylene wax and Fischer-Tropsch wax, and examples of the modified waxes include paraffin wax derivatives, montan wax derivatives, and microcrystalline wax derivatives.

Among the waxes, carnauba wax is preferable from the viewpoints of improving the rub resistance of an image. In addition, as the wax, a paraffin wax in which a hydrocarbon having 20 to 40 carbon atoms is a main component is preferable from the viewpoints of the glossiness of an image, prevention of water from being evaporated at nozzle tips, and an excellent water retention effect. In addition, polyethylene wax is preferable as the wax from the viewpoints of excellent compatibility with a resin and easiness in obtaining a uniform and good image. Polyethylene wax is preferable from the viewpoint of applying wettability as the wax. The polyethylene wax is easily modified, and for example, glycol-modified polyethylene wax can provide a wetting effect due to glycol, and thus is effective for maintaining the wettability of the ink at nozzle tips. The polyethylene wax is preferable in view that it is capable of further increasing the jetting stability of an ink.

It is preferable that the wax is added in the dispersion state where the wax in the form of particles is dispersed, and it is suitably used, for example, in the aqueous dispersion state (specifically in the emulsion state (emulsified dispersion) or the suspension state (solid particle dispersion)) where the wax in the form of particles is dispersed in water.

Examples of the ester compounds include the compounds, the fatty acid esters, and the like described in each publication of JP1983-86540A (JP-S58-86540A), JP1976-37217A (JP-S51-37217A), JP1979-159221A (JP-S54-159221A), JP1983-90633A (JP-S58-90633A), JP1976-141623A (JP-S51-141623A), and the like. Examples of the higher fatty acid esters include linear higher fatty acid esters, trimethylolpropane fatty acid esters, pentaerythritol fatty acid esters, and dipentaerythritol fatty acid esters.

Examples of silicone compounds include the compounds described in each publication of JP1975-117414A (JP-S50-117414A), JP1985-140341A (JP-S60-140341A), JP1985-140342A (JP-S60-140342A), JP1985-191240A (JP-S60-191240A), JP1984-4649A (JP-S59-4649A), and the like, and each specification of U.S. Pat. No. 4,404,276A, GP2509534A, GP1938959A, and the like.

Furthermore, examples of the carboxylic acid amide compounds include the compounds described in JP1980-79435A (JP-S55-79435A) and the like, and examples of the fluorine compounds include the compounds described in JP1988-19647A (JP-S63-19647A) and the like. Examples of the higher aliphatic acids or salts thereof include the higher aliphatic acids or salts thereof described in GB1263722A and the like.

Among the lubricants, from the viewpoint of improving the rub resistance of an image, at least one selected from the group consisting of particles of linear higher fatty acid ester wax, particles of hydrocarbon-based wax, silicone oil having a structure of $-(-Si(CH_3)_2)_n-$, 1-pentadecyl-2-hexadecyl-phthalic acid diester, and palmitic acid amide is preferable, and at least one selected from the group consisting of particles of linear higher fatty acid ester wax and particles of hydrocarbon-based wax is preferable.

(Water-Soluble Organic Solvent)

The ink in the present disclosure can contain a water-soluble organic solvent. Since the ink in the present disclosure contains the water-soluble organic solvent together with the polymer particles, the filming temperature of the polymer particles in the ink can be lowered, and the jettability or the like of the ink can be improved.

The "water-soluble organic solvent" as described herein refers to an organic solvent having a solubility of 1% by mass or more in water at 20° C.

As the water-soluble organic solvent, at least one selected from the group consisting of alkyleneoxy alcohol and alkyleneoxyalkyl ether is preferable. If the ink in the present disclosure includes these water-soluble organic solvents, the curl of recorded materials in a high-humidity environment can be inhibited.

The alkyleneoxy alcohol is preferably a propyleneoxy alcohol. Examples of the propyleneoxy alcohol include SUNNIX GP250 and SUNNIX GP400 (manufactured by Sanyo Chemical Industries, Ltd.).

The alkyleneoxyalkyl ether is preferably at least one selected from the group consisting of an ethyleneoxyalkyl ether having an alkyl moiety of 1 to 4 carbon atoms and a propyleneoxyalkyl ether having an alkyl moiety of 1 to 4 carbon atoms.

Examples of the alkyleneoxyalkyl ether include ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, and ethylene glycol monophenyl ether.

The ink in the present disclosure may further contain other organic solvents, if desired, in addition to the water-soluble organic solvent, for the purpose of preventing drying, accelerating permeation, controlling viscosity, or the like.

By using an organic solvent as an anti-drying agent, it is possible to effectively prevent nozzle clogging which may be caused by the ink being dried in the ink discharge port when an ink is discharged to record an image by an ink jet method. For the prevention of drying, a water-soluble organic solvent having a vapor pressure lower than that of water is preferable. Specific examples of the water-soluble organic solvent suitable for the prevention of drying include polyhydric alcohols typified by ethylene glycol, propylene glycol, diethylene glycol, polyethylene glycol, thiodiglycol, dithiodiglycol, 2-methyl-1,3-propanediol, 1,2,6-hexanetriol, acetylene glycol derivatives, glycerin, and trimethylolpropane, heterocycles such as 2-pyrrolidone, N-methyl-2-pyrrolidone, 1,3-dimethyl-2-imidazolidinone, and N-ethylmorpholine, sulfur-containing compounds such as sulfolane, dimethylsulfoxide, and 3-sulfolene, polyfunctional compounds such as diacetone alcohol and diethanolamine, and urea derivatives. In particular, polyhydric alcohols such as glycerin and diethylene glycol are preferable as the water-soluble organic solvent for the prevention of drying.

Furthermore, an organic solvent may be used for better permeation of an ink into the recording medium. Specific examples of the organic solvent suitable for permeation acceleration include alcohols such as ethanol, isopropanol, butanol, and 1,2-hexanediol, sodium lauryl sulfate, sodium oleate, and nonionic surfactants.

In addition to the above organic solvents, a water-soluble organic solvent can also be used to adjust viscosity. Examples of the water-soluble organic solvent that can be used to adjust viscosity include alcohols (methanol, ethanol, propanol, and the like), amines (ethanolamine, diethanolamine, triethanolamine, ethylenediamine, diethylenetriamine, and the like), and other polar solvents (formamide, N,N-dimethylformamide, N,N-dimethylacetamide, dimethylsulfoxide, sulfolane, 2-pyrrolidone, acetonitrile, acetone, and the like).

(Surfactant)

Various surfactants are preferably used in the ink in the present disclosure. Among surfactants, an acetylene glycol-based surfactant is preferably used.

As compared with the other surfactants, for the acetylene glycol-based surfactant, the surface tension and the interfacial tension with an ink jet head member (head nozzles and the like) in contact with the ink can be easily maintained at an appropriate level, and it is difficult for foam to be formed. Therefore, when the ink in the present disclosure includes an acetylene glycol-based surfactant, the ink jetting stability upon the discharge of an ink is enhanced. In addition, when the ink in the present disclosure includes the acetylene glycol-based surfactant, the wettability and the permeability of an ink with respect to a recording medium are improved and the shade unevenness and the bleeding of an ink are suppressed, which is advantageous for forming a fine and accurate image.

Examples of the acetylene glycol-based surfactant include SURFYNOL 104, SURFYNOL 104E, SURFYNOL 104H, SURFYNOL 104A, SURFYNOL 104BC, SURFYNOL 104DPM, SURFYNOL 104PA, SURFYNOL 104PG-50, SURFYNOL 104S, SURFYNOL 420, SURFYNOL 440, SURFYNOL 465, SURFYNOL 485, SURFYNOL SE, SURFYNOL SE-F, SURFYNOL 504, SURFYNOL 61, SURFYNOL DF37, SURFYNOL CT111, SURFYNOL CT121, SURFYNOL CT131, SURFYNOL CT136, SURFYNOL TG, and SURFYNOL GA (all manufactured by Air Products and Chemicals Inc.); OLFINE B, OLFINE Y, OLFINE P, OLFINE A, OLFINE STG, OLFINE SPC, OLFINE E1004, OLFINE E1010, OLFINE PD-001, OLFINE PD-002W, OLFINE PD-003, OLFINE PD-004, OLFINE EXP. 4001, OLFINE EXP. 4036, OLFINE EXP. 4051, OLFINE AF-103, OLFINE AF-104, OLFINE AK-02, OLFINE SK-14, and OLFINE AE-3 (all manufactured by Nissin Chemical Co., Ltd.); and ACETYLENOL E00, ACETYLENOL E00P, ACETYLENOL E40, and ACETYLENOL E100 (all manufactured by Kawaken Fine Chemicals Co., Ltd.).

The content of the surfactant in the ink is preferably 0.1% by mass to 1.5% by mass, and more preferably 0.5% by mass to 1.0% by mass, with respect to the total mass of the ink. When the content of the surfactant in the ink is 0.1% by mass or more with respect to the total mass of the ink, the ink easily wets and is uniformly diffused on fibers of a recording substrate, the rub resistance of an image is improved, and the bleeding of an image is suppressed, thereby obtaining a more uniform image. When the content of the surfactant in the ink is 1.5% by mass or less with respect to the total mass of the ink, the preservation stability and the jetting stability of the aqueous ink is more excellent.

(2-Pyrrolidone)

The ink in the present disclosure can contain 2-pyrrolidone. The 2-pyrrolidone functions as a wetting agent. The 2-pyrrolidone has an action to improve the permeability of an ink, leading to a longer average length of the ink droplets that adhere to fibers of a recording substrate.

The content of 2-pyrrolidone in the ink is preferably from 0.5% by mass to 50% by mass, and more preferably from 0.5% by mass to 30% by mass, with respect to the total amount of the ink, from the viewpoints of imparting permeability to the ink to increase the diameter of the ink droplets (in this case, the average length). In addition, the content of 2-pyrrolidone in the ink is particularly preferably from 1% by mass to 30% by mass with respect to the total amount of the ink, from the viewpoint of satisfying both an action of increasing a dot diameter and the rub resistance of an image.

(Others)

If necessary, the ink in the present disclosure can include other additives in addition to the above-described components. Examples of such other additives include well-known additives such as a matting agent, an antifading agent, an emulsion stabilizer, a permeation accelerator, an ultraviolet absorber, a preservative, an antibacterial agent, a pH adjusting agent, a surface tension adjusting agent, an anti-foaming agent, a viscosity adjusting agent, a dispersant, a dispersion stabilizer, a rust inhibitor, and a chelating agent. These various additives may be directly added after the preparation of the ink, or may be added during the preparation of the ink.

The details of such other additives are described in paragraph Nos. [0098] to [0105] of JP2010-155359A.

[Maintenance Treatment Step]

In the image recording method of the present disclosure, an image is recorded on a recording substrate through the above-described steps, and if desired, a device can be subjected to a maintenance treatment, using a maintenance liquid for ink jet recording.

The maintenance treatment refers to cleaning a flow path through an ink between an ink supply tank and an ink jet head using a maintenance liquid for ink jet recording, recovering an ink solidified by drying (redispersing dispersion components in the ink), performing moisturization in order to prevent a nozzle surface from being dried in the state where the ink is charged, and the like.

In the maintenance treatment, a fabric which has absorbed a maintenance liquid (for example, a woven fabric and a non-woven fabric), or the like is brought into contact with a head surface of the device, and if desired, it is rubbed, the head surface is prevented from being dried, and the removal of the solidified and fixed ink may also be carried out. Further, the maintenance liquid is stored in the ink tank, and the maintenance liquid is flown through a flow path through which the ink is flown, or the cleaning of the flow path and the removal of the solidified ink may also be carried out by filling the maintenance liquid.

The maintenance liquid for ink jet recording in the present disclosure contains water and a moisturizer, and may further contain other components such as a surfactant.

(Moisturizer)

A moisturizer is contained as a component that has both a moisturizing function and a cleaning function for an ink.

Examples of the moisturizer include water-soluble solvents such as polyol compounds (for example, glycerin, ethylene glycol, diethylene glycol, triethylene glycol, tetraethylene glycol, polyethylene glycol, propylene glycol, dipropylene glycol, polypropylene glycol, 1,3-propanediol, 1,4-butanediol, 1,5-pentanediol, pentaerythritol, 1,6-hexanediol, 1,8-octanediol, 2-methylpropane-1,3-diol, 2,2-dimethyl-1,3-propanediol, and 2,2-diethyl-1,3-propanediol), alcohol-based compounds such as diethylene glycol monoethyl ether, diethylene glycol monobutyl ether, triethylene glycol monomethyl ether, triethylene glycol monoethyl ether, triethylene glycol monobutyl ether, dipropylene glycol monomethyl ether, tripropylene glycol monomethyl ether, diethylene glycol monohexyl ether, and dipropylene glycol monobutyl ether, and lactam compounds (for example, 2-pyrrolidone and N-methyl-2-pyrrolidone); and nitrogen compounds such as water-soluble solid moisturizers (for example, urea, thiourea, and N-ethylurea).

The content of the moisturizer in the maintenance liquid for ink jet recording is preferably 0.1% by mass to 60% by mass, and more preferably 2% by mass to 50% by mass, with respect to the total amount of the maintenance liquid for ink jet recording. When the maintenance liquid for ink jet recording has a content of the moisturizer falling between 0.1% by mass and 60% by mass with respect to the total amount of the maintenance liquid for ink jet recording, the cleaning properties is excellent and the stability during replacement of the cleaning liquid with an ink or replacement of the ink with a cleaning liquid is excellent.

(Water)

The maintenance liquid for ink jet recording in the present disclosure contains water.

As water, pure water, ion exchange water, or the like can be used.

The content of water in the maintenance liquid for ink jet recording is preferably 20% by mass to 90% by mass, and more preferably 30% by mass to 80% by mass.

(Surfactant)

The maintenance liquid for ink jet recording in the present disclosure may contain various surfactants. Among surfactants, an acetylene glycol-based surfactant is preferably used.

In comparison of the acetylene glycol-based surfactant with the other surfactants, the surface tension and the interfacial tension with an ink jet head member (head nozzles and the like) in contact with the ink can be easily maintained at an appropriate level and it is difficult for foams to be formed. Therefore, when the maintenance liquid for ink jet recording in the present disclosure contains the acetylene glycol-based surfactant, the cleaning properties at a time of cleaning the flow path between the ink tank and the inside of the head is enhanced.

Examples of the acetylene glycol-based surfactant include the same acetylene glycol-based surfactants as those that can be used in the ink in the present disclosure.

The content of the surfactant in the maintenance liquid for ink jet recording is preferably 0.1% by mass to 5% by mass, and more preferably 0.2% by mass to 3.0% by mass, with respect to the total mass of the ink, with respect to the total amount of the maintenance liquid for ink jet recording. When the content of the surfactant in the maintenance liquid for ink jet recording falls between 0.1% by mass and 5% by mass with respect to the total amount of the maintenance liquid for ink jet recording, the maintenance liquid for ink jet recording easily wets with regard to the flow path, the foaming properties are reduced, and thus, excellent cleaning properties are obtained.

(Antifoaming Agent)

The maintenance liquid for ink jet recording of the present disclosure may also contain an anti-foaming agent.

Examples of the anti-foaming agent include silicone-based compounds and nonionic compounds, and among these, the silicone-based anti-foaming agents are preferable.

As the silicone-based anti-foaming agent, a compound having a polysiloxane structure is preferable, and BYK-024 manufactured by BYK-Chemie Japan K. K. is particularly preferable.

As the nonionic anti-foaming agent, a compound having a polyethylene-polypropylene structure is preferable, and ADEKA PLURONIC L, ADEKA PLURONIC P, ADEKA PLURONIC F, ADEKA PLURONIC R, ADEKA PLURONIC TR, and the like, manufactured by ADEKA Corporation, are preferable.

The content of the anti-foaming agent in the maintenance liquid for ink jet recording is preferably 0.01% by mass to 5% by mass, and more preferably 0.02% by mass to 3.0% by mass, with respect to the total amount of the maintenance liquid for ink jet recording. When the content of the anti-foaming agent in the maintenance liquid for ink jet recording falls between 0.01% by mass and 5% by mass with respect to the total amount of the maintenance liquid for ink jet recording, the anti-foaming properties and the stability of the maintenance liquid are excellent, and thus, excellent cleaning properties and quality stability are obtained.

(Other Additives)

The maintenance liquid for ink jet recording of the present disclosure may contain, if desired, in addition to the components described above, other additives such as an antifading agent, an emulsification stabilizer, a permeation accelerator, an ultraviolet absorbent, an antirust agent, an antiseptic, a mildew proofing agent, a pH adjusting agent, a viscosity adjusting agent, and the silicone-based compounds described in JP2011-63777A.

—Physical Properties of Maintenance Liquid—

The viscosity of the maintenance liquid for ink jet recording is preferably 0.5 mPa·s to 10 mPa·s, more preferably 1 mPa·s to 8 mPa·s, and still more preferably 2 mPa·s to 6 mPa·s from the viewpoint cleaning properties.

The viscosity is a value measured at 30° C., using a VISCOMETER TV-22 (manufactured by TOKI SANGYO CO., LTD.).

The surface tension of the maintenance liquid for ink jet recording is preferably 20 mN/m to 60 mN/m, more preferably 20 mN/m to 45 mN/m, and still more preferably 25 mN/m to 40 mN/m, from the viewpoints of chargeability into a flow path and an ink jet head, and maintenance properties.

The surface tension is a value measured at 30° C., using an Automatic Surface Tensiometer CBVP-Z (manufactured by Kyowa Interface Science Co., Ltd.).

<<Image Recorded Article>>

The image recorded article of the present disclosure includes an image recorded by the image recording method. That is, it is a recorded material having an ink image recorded on a recording substrate which is an aggregate of non-absorbent or low-absorbent fiber materials. Examples of the applications of the image recorded article include first-aid supplies, sanitary supplies, care supplies, and medical and sanitary materials and supplies. As the specific supplies, examples of the first-aid supplies include gauze and triangular cloth, examples of the hygiene products include paper diapers, sanitary napkins, and hip wiper sheets.

EXAMPLES

Hereinafter, the present invention will be described in more detail with reference to Examples, but the present invention is not limited to the following Examples as long as not departing from the scope of the present invention. Unless otherwise specifically stated, the "part(s)" is based on mass.

The acid values in Examples were determined by the method described in Japanese Industrial Standards (JIS K 0070: 1992).

Furthermore, the "Mw" in Examples represents a weight-average molecular weight, and measurement of the weight-average molecular weight was carried out by gel permeation chromatography (GPC) under the following conditions, as described above. The calibration curve was prepared from eight samples of "STANDARD SAMPLE TSK standard, polystyrene" manufactured by Tosoh Corporation: "F-40", "F-20", "F-4", "F-1", "A-5000", "A-2500", "A-1000", and "n-propylbenzene".

<Conditions>

GPC: HLC (registered trademark)-8220 GPC (manufactured by Tosoh Corporation)

Columns: Three columns of TSKgel (registered trademark), Super Multipore HZ-H (manufactured by Tosoh Corporation, 4.6 mmID×15 cm)

Eluent: Tetrahydrofuran (THF)

Sample concentration: 0.45% by mass

Flow rate: 0.35 ml/min

Sample feed amount: 10 µl

Measurement temperature: 40° C.

Detector: Refractive index (RI)

Example 1

<Preparation of Magenta Ink>
1. Synthesis of Water-Soluble Polymer Dispersant P-1

Methacrylic acid (172 parts), benzyl methacrylate (828 parts), and isopropanol (375 parts) were mixed to prepare a monomer feed composition. 2,2-Azobis(2-methylbutyronitrile) (22.05 parts) and isopropanol (187.5 parts) were mixed to prepare an initiator feed composition.

Isopropanol (187.5 parts) was added dropwise to a mixture of the monomer feed composition and the initiator feed composition for 2 hours in a nitrogen atmosphere while warming the mixture to 80° C. After dropwise addition, the mixture was further kept at 80° C. for 4 hours, and then cooled to 25° C. After cooling, the solvent was removed under reduced pressure to obtain a water-soluble polymer dispersant P-1 (water-soluble polymer).

The obtained water-soluble polymer had a weight-average molecular weight determined by GPC of about 50,000, and an acid value determined by the method of 112 mgKOH/g.

2. Preparation of Magenta Pigment Dispersion K1

For the water-soluble polymer dispersant P-1 (150 parts), 0.8 equivalents in the amount of methacrylic acid in the water-soluble polymer dispersant was neutralized using an aqueous potassium hydroxide solution, and distilled water was added thereto to adjust the concentration of the water-soluble polymer dispersant to 25% by mass, thereby preparing an aqueous water-soluble polymer dispersant solution.

This water-soluble polymer dispersant aqueous solution (97.2 parts), Pigment•Red 122 (trade name: CROMOPHTAL Jet Magenta DMQ, manufactured by Ciba Specialty Chemicals Inc.; magenta pigment) (48.6 parts), water (78.2 parts), and dipropylene glycol (100 parts) were mixed, and dispersed until a desired volume-average particle diameter was obtained by means of a beads mill using a 0.1 mm φ zirconia beads to obtain a dispersion N1 (non-crosslinked dispersion) of a polymer-coated Pigment•Red 122 having a pigment concentration 15% by mass.

To the dispersion N1 (150 parts) were added 100 g of ion exchange water and 1.1 parts of Denacol (registered trademark) EX-321 (epoxy equivalents: 140) manufactured by Nagase ChemteX Corporation, the mixture was reacted at 60° C. for 6.5 hours, and then cooled to 25° C., and a polymer coating the Pigment•Red 122 was crosslinked. The obtained crosslinked dispersion was purified using an ultrafiltration filter (molecular weight of cut-off: 50,000, trade name: Q0500076E ULTRA FILTER, manufactured by ADVANTEC MFS, Inc.), and then adjusted to have a pigment concentration of 15% by mass to obtain a magenta pigment dispersion K1 which is a dispersion (crosslinked dispersion) of the polymer-coated Pigment•Red 122.

In this case, the amount of the crosslinking agent to be used with respect to 100 parts of the water-soluble polymer dispersant was 9.78 parts.

The crosslinking rate (unit: % by mole) by the use of a crosslinking agent was calculated as follows.

1.1 parts of the Denacol EX-321 (molecular weight: 140) as the crosslinking agent was reacted with 11.25 parts of the water-soluble polymer dispersant, and thus, the molar equivalents of the crosslinking agent to be reacted with 1 mole of the water-soluble polymer dispersant was (1.1/140)/(11.25/weight-average molecular weight (50,000) of the water-soluble polymer dispersant)=34.9.

Since Denacol EX-321 reacts with one carboxyl group, the number of moles of reactive groups that can react with the crosslinking agent in 1 mole of water-soluble polymer dispersant is a total sum of the number of moles of methacrylic acid (molecular weight: 86) contained in 1 mole of the water-soluble polymer dispersant. Here, the methacrylic acid is present in a proportion of the water-soluble polymer of 172 parts (methacrylic acid)/1,000 parts (a total amount of methacrylic acid and benzyl methacrylate)=0.172, and as a result, the total sum of the number of moles of methacrylic acid contained in 1 mole of the water-soluble polymer is 50,000×0.172/86=100 moles.

Accordingly, the crosslinking rate (% by mole) becomes 34.9×100/100=34.9% by mole.

3. Preparation of Magenta Ink

The components in the following composition were mixed to prepare an ink A. After preparing the liquid, the ink A was filled in a plastic disposable syringe and filtered through a polyvinylidene fluoride (PVDF)-made filter (Millex-SV manufactured by Merck Millipore Corporation, diameter: 25 mm) having a pore diameter of 5 μm to provide a magenta ink.

<Composition of Ink>

Magenta pigment dispersion K1 (pigment concentration: 15% by mass) . . . 20 parts Dipropylene glycol . . . 32 parts Latex (polymer particles; resin solid content: 25% by mass) of a urethane-based resin represented by the following Structural Formula (acid value: 48 mmol/g, weight-average molecular weight: 100,000) . . . 40 parts Ion exchange water . . . Balance (8 parts) in a case where the total amount of the ink is taken as 100 parts

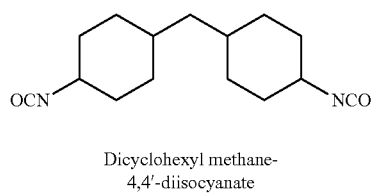

Dicyclohexyl methane-4,4'-diisocyanate

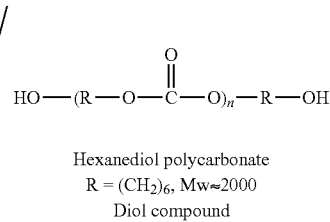

Hexanediol polycarbonate
R = (CH$_2$)$_6$, Mw≈2000
Diol compound

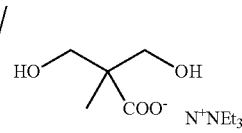

Triethylamine salt of dimethylolpropanoic acid

~Preparation of Latex of Urethane-Based Resin~

58.5 g of hexanediol polycarbonate (molecular weight: 2,000), 30 g of dicyclohexyl methane-4,4'-diisocyanate, 11.5 g of dimethylolpropanoic acid, and 150 g of methyl ethyl ketone were mixed in a four-neck flask having a volume of 1 liter, equipped with a reflux condense, a thermometer, and a stirrer, taken and warmed at room temperature to 90° C. for 30 minutes in a nitrogen atmosphere, and allowed to perform a urethanization reaction for 2 hours. Subsequently, to the polymer containing solution after the urethanization reaction was added 8.7 g of triethylamine, thereby obtaining a solution (latex) containing a neutralized urethane-based resin.

<Image Recording and Evaluation>

1. Image Recording

As a recording substrate, a polypropylene non-woven fabric (fiber surface density: 30 g/m$^2$, thickness: 600 μm, fiber diameter: 20 μm) which has been subjected to exposure with energy at 1,500 mJ/cm$^2$ (surface treatment) using Ex-Mini (manufactured by HAMAMATSU PHOTONICS K. K.) for an excimer treatment in a surface treatment step was used. Further, Ex-Mini is a device capable of light irradiation from excimer emission using a xenon gas, and the light-emitting central wavelength of the light used for the exposure was 172 nm.

The magenta ink prepared as described above in an amount of liquid droplets of 60 pL was discharged with Polaris PQ (manufactured by FUJIFILM Dimatix Inc.) to form a 100% solid image at 200 dpi (ink application step) on the polypropylene non-woven fabric that had been subjected to the surface treatment. The obtained solid image was brought into close contact with a nylon mesh plate and warm air was blown toward an image-non-recorded surface of the polypropylene non-woven fabric with a drier for 30 seconds at a wind speed of 7 m/s and a temperature of 40° C. to be dried and fixed (drying and fixing step). In this way, an image sample was obtained.

2. Measurement and Evaluation

The image sample obtained as described above was measured and evaluated as follows. The results of the measurements and the evaluations are shown in Tables 1 to 3 below.

—A. Rub Resistance—

For an image portion of the obtained image sample, the scratch resistance (rub resistance) in the wet state was evaluated.

Using a Color Fastness Rubbing Tester (manufactured by Yasuda Seiki Seisakusho Ltd., No. 428), the image portion of the obtained image sample was rubbed back and forth ten times with white cotton wet with 0.05 ml of water (a wet area of 20 mm×20 mm) by applying a force of 2 Newtons (N) at an area of 20 mm×20 mm, and the rub resistance of the image was evaluated in accordance with the following evaluation standard by visually inspecting the presence or absence of a color transfer onto the white cotton. A to C among the evaluation standard indicate that the rub resistance is in an allowable range.

<Evaluation Standard>

A: Even when the image portion was rubbed back and forth 10 times, no color transfer was observed on the white cotton.

B: When the image portion was rubbed back and forth 10 times, light color transfer was slightly observed on the white cotton.

C: When the image portion was rubbed back and forth 10 times, low-density color transfer was observed on the entire rubbing surface (20 mm×20 mm) of the white cotton, but the color transfer posed no substantial problems in practice.

D: When the image portion was rubbed back and forth 10 times, high-density color transfer at the same level as that of the image portion was observed on the entire rubbing surface (20 mm×20 mm) of the white cotton, but the level of the color transfer was at the degree that posed no substantial problems in practice.

—B. Image Density—

For the image portion of the obtained image sample, the image density was measured. Using an Optical Densitometer manufactured by GretagMacbeth, the optical density (OD) of the image portion of the image sample was measured, and the image density was evaluated in accordance with the following evaluation standard, based on the measured value thus obtained.

<Evaluation Standard>

A: OD≥0.35
B: 0.35>OD≥0.3
C: 0.3>OD≥0.25
D: 0.25>OD

—C. Texture—

For the image portion of the obtained image sample, the texture was evaluated. The texture of the image was evaluated in accordance with the following evaluation standard, based on the feelings obtained by touching the image portion of the image sample with the finger and the observation results after bending the image portion of the image sample. A to C in the evaluation standard indicate that the texture is in an allowable range.

<Evaluation Standard>

A: When the image portion was touched with the finger, a smooth texture is obtained, and even when the image portion is bent, no folded marks remain.

B: When the image portion was touched with the finger, there is a feeling that the finger is slightly stuck, but even when the image portion is bent, no folded mark remains.

C: When the image portion was touched with the finger, there is a feeling that the finger is slightly stuck, and when the image portion is bent, vague folded marks remain, which is, however, at a level for practical use.

D: When an image portion was touched with the finger, there is a feeling that the slip of the finger is poor, and when the image portion is bent, folded marks remain, which is at a level with practical problems.

Example 2

In the same manner as in Example 1 except that triethylamine (NEt$_3$) was changed to tributylamine (NBu$_3$) as the compound for forming a cation (counter ion) of a urethane resin in the ink composition of Example 1, a magenta ink was prepared. Further, in the same manner as in Example 1, image recording was performed on the non-woven fabric, and the image portion of the obtained sample image was evaluated.

Example 3

In the same manner as in Example 1 except that triethylamine (NEt$_3$) was changed to pyridine as the compound for forming a cation (counter ion) of a urethane resin in the ink composition of Example 1, a magenta ink was prepared. Further, in the same manner as in Example 1, image recording was performed on a non-woven fabric, and the image portion of the obtained sample image was evaluated.

Example 4

In the same manner as in Example 1 except that triethylamine (NEt$_3$) was changed to morpholine as the compound for forming a cation (counter ion) of a urethane resin in the ink composition of Example 1, a magenta ink was prepared. Further, in the same manner as in Example 1, image recording was performed on a non-woven fabric, and the image portion of the obtained sample image was evaluated.

Example 5

In the same manner as in Example 1 except that triethylamine (NEt$_3$) was changed to dimethylaminopyridine (DMAP) as the compound for forming a cation (counter ion) of a urethane resin in the ink composition of Example 1, a magenta ink was prepared. Further, in the same manner as in Example 1, image recording was performed on a non-woven fabric, and the image portion of the obtained sample image was evaluated.

Example 6

In the same manner as in Example 1 except that the latex of the urethane-based resin was changed to the latex of an acrylic resin in the ink composition of Example 1, a magenta ink was prepared. Further, in the same manner as in Example 1, image recording was performed on a non-woven fabric, and the image portion of the obtained sample image was evaluated.

For the latex of the acrylic resin, the monomer composition other than the solvent is as follows, and the weight-average molecular weight of the acrylic resin measured by GPC is 100,000. Further, as the acrylic resin of the present Example, a triethylamine salt neutralized with triethylamine by the polymerization of the monomers was used.

Cyclohexyl methacrylate . . . 35% by mass
Methoxypolyethylene glycol acrylate . . . 58% by mass
Methacrylic acid . . . 7% by mass

Example 7

In the same manner as in Example 1 except that the cation (counter ion) of triethylamine (NEt$_3$) was changed to a sodium (Na) ion in the ink composition of Example 6, a magenta ink was prepared. Further, in the same manner as in Example 6, image recording was performed on a non-woven fabric, and the image portion of the obtained sample image was evaluated.

Example 8

In the same manner as in Example 1 except that the weight-average molecular weight of the hexanediol polycarbonate was changed to 200 with respect to the configuration of the urethane-based resin in the ink composition of Example 1, a magenta ink was prepared. Further, in the same manner as in Example 1, image recording was performed on a non-woven fabric, and the image portion of the obtained sample image was evaluated.

Example 9

In the same manner as in Example 1 except that the weight-average molecular weight of the hexanediol polycarbonate was changed to 500 with respect to the configuration of the urethane-based resin in the ink composition of Example 1, a magenta ink was prepared. Further, in the same manner as in Example 1, image recording was performed on a non-woven fabric, and the image portion of the obtained sample image was evaluated.

Example 10

In the same manner as in Example 1 except that the weight-average molecular weight of the hexanediol polycarbonate was changed to 20,000 with respect to the configuration of the urethane-based resin in the ink composition of Example 1, a magenta ink was prepared. Further, in the same manner as in Example 1, image recording was performed on a non-woven fabric, and the image portion of the obtained sample image was evaluated.

Example 11

In the same manner as in Example 1 except that the weight-average molecular weight of the hexanediol polycarbonate was changed to 25,000 with respect to the configuration of the urethane-based resin in the ink composition of Example 1, a magenta ink was prepared. Further, in the same manner as in Example 1, image recording was performed on a non-woven fabric, and the image portion of the obtained sample image was evaluated.

Example 12

In the same manner as in Example 1 except that hexanediol polycarbonate having a weight-average molecular weight of 2,000 was changed to polycaprolactonediol having a weight-average molecular weight of 500 with respect to the configuration of the urethane-based resin in the ink composition of Example 1, a magenta ink was prepared. Further, in the same manner as in Example 1, image recording was performed on a non-woven fabric, and the image portion of the obtained sample image was evaluated.

Example 13

In the same manner as in Example 1 except that hexanediol polycarbonate having a weight-average molecular weight of 2,000 was changed to polycaprolactonediol having a weight-average molecular weight of 2,000 with respect to the configuration of the urethane-based resin in the ink composition of Example 1, a magenta ink was prepared. Further, in the same manner as in Example 1, image recording was performed on a non-woven fabric, and the image portion of the obtained sample image was evaluated.

Example 14

In the same manner as in Example 1 except that hexanediol polycarbonate having a weight-average molecular weight of 2,000 was changed to polycaprolactonediol having a weight-average molecular weight of 20,000 with respect to the configuration of the urethane-based resin in the ink composition of Example 1, a magenta ink was prepared. Further, in the same manner as in Example 1, image recording was performed on a non-woven fabric, and the image portion of the obtained sample image was evaluated.

Example 15

In the same manner as in Example 1 except that hexanediol polycarbonate having a weight-average molecular weight of 2,000 was changed to polypropylene glycol having a weight-average molecular weight of 2,000 with respect to the configuration of the urethane-based resin in the ink composition of Example 1, a magenta ink was prepared. Further, in the same manner as in Example 1, image recording was performed on a non-woven fabric, and the image portion of the obtained sample image was evaluated.

Example 16

In the same manner as in Example 1 except that hexanediol polycarbonate having a molecular weight of 2,000 was changed to polytetramethylene glycol having a weight-average molecular weight of 2,000 with respect to the configuration of the urethane-based resin in the ink composition of Example 1, a magenta ink was prepared. Further, in the same manner as in Example 1, image recording was performed on a non-woven fabric, and the image portion of the obtained sample image was evaluated.

Example 17

In the same manner as in Example 1 except that the acid value of the urethane-based resin was changed from 48 mmol/g to 100 mmol/g in the ink composition of Example 1, a magenta ink was prepared. Further, in the same manner as in Example 1, image recording was performed on a non-woven fabric, and the image portion of the obtained sample image was evaluated.

Example 18

In the same manner as in Example 1 except that the acid value of the urethane-based resin was changed from 48 mmol/g to 200 mmol/g in the ink composition of Example 1, a magenta ink was prepared. Further, in the same manner as in Example 1, image recording was performed on a non-woven fabric, and the image portion of the obtained sample image was evaluated.

Example 19

In the same manner as in Example 1 except that the acid value of the urethane-based resin was changed from 48 mmol/g to 280 mmol/g in the ink composition of Example 1, a magenta ink was prepared. Further, in the same manner as in Example 1, image recording was performed on a non-woven fabric, and the image portion of the obtained sample image was evaluated.

Example 20

In the same manner as in Example 1 except that the cation (counter ion) of triethylamine ($NEt_3$) was changed to a sodium (Na) ion in the ink composition of Example 1, a magenta ink was prepared. Further, in the same manner as in Example 1, image recording was performed on a non-woven fabric, and the image portion of the obtained sample image was evaluated.

Example 21

In the same manner as in Example 1 except that the cation (counter ion) of triethylamine ($NEt_3$) was changed to a potassium (K) ion in the ink composition of Example 1, a magenta ink was prepared. Further, in the same manner as in Example 1, image recording was performed on a non-woven fabric, and the image portion of the obtained sample image was evaluated.

Example 22

In the same manner as in Example 1 except that the illuminance of the light source was changed from 50 $mW/cm^2$ to 10 $mW/cm^2$ in the ink composition of Example 1, a magenta ink was prepared. Further, in the same manner as in Example 1, image recording was performed on a non-woven fabric, and the image portion of the obtained sample image was evaluated.

Example 23

In the same manner as in Example 1 except that the illuminance of the light source was changed from 50 $mW/cm^2$ to 30 $mW/cm^2$ in the ink composition of Example 1, a magenta ink was prepared. Further, in the same manner as in Example 1, image recording was performed on a non-woven fabric, and the image portion of the obtained sample image was evaluated.

Example 24

In the same manner as in Example 1 except that the illuminance of the light source was changed from 50 $mW/cm^2$ to 200 $mW/cm^2$ in the ink composition of Example 1, a magenta ink was prepared. Further, in the same manner as in Example 1, image recording was performed on a non-woven fabric, and the image portion of the obtained sample image was evaluated.

Example 25

In the same manner as in Example 1 except that the illuminance of the light source was changed from 50 $mW/cm^2$ to 500 $mW/cm^2$ in the ink composition of Example 1, a magenta ink was prepared. Further, in the same manner as in Example 1, image recording was performed on a non-woven fabric, and the image portion of the obtained sample image was evaluated.

Example 26

In the same manner as in Example 1 except that the irradiation time was changed from 2 seconds to 0.01 seconds in the ink composition of Example 1, a magenta ink was prepared. Further, in the same manner as in Example 1, image recording was performed on a non-woven fabric, and the image portion of the obtained sample image was evaluated.

Example 27

In the same manner as in Example 1 except that the irradiation time was changed from 2 seconds to 0.1 seconds in the ink composition of Example 1, a magenta ink was prepared. Further, in the same manner as in Example 1, image recording was performed on a non-woven fabric, and the image portion of the obtained sample image was evaluated.

Example 28

In the same manner as in Example 1 except that the irradiation time was changed from 2 seconds to 5 seconds in the ink composition of Example 1, a magenta ink was prepared. Further, in the same manner as in Example 1, image recording was performed on a non-woven fabric, and the image portion of the obtained sample image was evaluated.

Example 29

In the same manner as in Example 1 except that the irradiation time was changed from 2 seconds to 10 seconds in the ink composition of Example 1, a magenta ink was prepared. Further, in the same manner as in Example 1, image recording was performed on a non-woven fabric, and the image portion of the obtained sample image was evaluated.

Comparative Example 1

In the same manner as in Example 1 except that a non-woven fabric which had not been pretreated was used, a magenta ink was prepared. Further, in the same manner as in Example 1, image recording was performed on a non-woven fabric, and the image portion of the obtained sample image was evaluated.

Comparative Example 2

In the same manner as in Example 1 except that a non-woven fabric which had not been subjected to a pretreatment was used, and further, the latex of the urethane-based resin was changed to the latex of an acrylic resin, a magenta ink was prepared. Further, in the same manner as in Example 1, image recording was performed on a non-woven fabric, and the image portion of the obtained sample image was evaluated.

Comparative Example 3

In the same manner as in Example 1 except that a non-woven fabric which had been subjected to a corona treatment under the following the following corona treatment, instead of a pretreatment by irradiation with light from excimer emission, was used, a magenta ink was prepared. Further, in the same manner as in Example 1, image recording was performed on a non-woven fabric, and the image portion of the obtained sample image was evaluated.

~Corona Treatment Conditions~

A corona treatment was carried out twice under the conditions a treatment voltage of 5 kV and a treatment rate of 50 mm/sec, using CORONA MASTER (manufactured by Shinko Electric & Instrumentation Co., Ltd., PS-10S).

Comparative Example 4

In the same manner as in Example 1 except that a non-woven fabric which had been subjected to a treatment by irradiation from a metal halide mercury lamp (trade name: VzeroII-85, manufactured by Neopt Co., Ltd.), instead of the pretreatment by irradiation with light from excimer emission under the following the following corona treatment, was used, a magenta ink was prepared. Further, in the same manner as in Example 1, image recording was performed on a non-woven fabric, and the image portion of the obtained sample image was evaluated.

(Reference Data 1)

In the same manner as in Example 1, a magenta ink was prepared. Further, in the same manner as in Example 1, image recording was performed on a polypropylene film, instead of the non-woven fabric, and the image portion of the obtained sample image was evaluated.

(Reference Data 2)

In the same manner as in Example 1 except that the latex of the urethane-based resin was changed to the latex of an acrylic resin, a magenta ink was prepared. Further, in the same manner as in Example 1, image recording was performed on a polypropylene film, instead of the non-woven fabric, and the image portion of the obtained sample image was evaluated.

(Reference Data 3)

In the same manner as in Example 1, a magenta ink was prepared. Further, in the same manner as in Example 1, image recording was performed on a polypropylene film which had not been subjected to a pretreatment, instead of the non-woven fabric, and the image portion of the obtained sample image was evaluated.

(Reference Data 4)

In the same manner as in Example 1, a magenta ink was prepared. Further, in the same manner as in Example 1, image recording was performed on a polypropylene film which had been subjected to a corona treatment, instead of the non-woven fabric, and the image portion of the obtained sample image was evaluated.

(Reference Data 5)

In the same manner as in Example 1, a magenta ink was prepared. Further, in the same manner as in Example 1, image recording was performed on a polypropylene film which had been subjected to a treatment by irradiation from a metal halide mercury lamp, instead of the non-woven fabric, and the image portion of the obtained sample image was evaluated.

TABLE 1

| | Pretreatment | Illuminance | Irradiation time | Substrate | Configuration of polymer particles | | | | | Evaluation | | |
|---|---|---|---|---|---|---|---|---|---|---|---|---|
| | | | | | Type | Counter ion | Acid value | Mw | Diol compound | Image density | Rub resistance | Texture |
| Example 1 | Excimer | 50 mW/cm² | 2 seconds | Non-woven fabric | Urethane | NEt₃ | 48 | 100,000 | Hexanediol polycarbonate Mn = 2,000 | A | A | A |
| Comparative Example 1 | None | — | — | Non-woven fabric | Urethane | NEt₃ | 48 | 100,000 | Hexanediol polycarbonate Mn = 2,000 | D | D | A |
| Comparative Example 2 | None | — | — | Non-woven fabric | Acryl | NEt₃ | 48 | 100,000 | — | D | D | B |
| Comparative Example 3 | Corona | 5 kV * at a treatment voltage | 2 seconds | Non-woven fabric | Urethane | NEt₃ | 48 | 100,000 | Hexanediol polycarbonate Mn = 2,000 | C | C | D |
| Comparative Example 4 | Metal halide mercury | 50 mW/cm² | 2 seconds | Non-woven fabric | Urethane | NEt₃ | 48 | 100,000 | Hexanediol polycarbonate Mn = 2,000 | C | D | B |
| Reference Data 1 | Excimer | 50 mW/cm² | 2 seconds | Film | Urethane | NEt₃ | 48 | 100,000 | Hexanediol polycarbonate Mn = 2,000 | C | C | B |

TABLE 1-continued

| | Pretreatment | Illuminance | Irradiation time | Substrate | Configuration of polymer particles | | | | | Evaluation | | |
|---|---|---|---|---|---|---|---|---|---|---|---|---|
| | | | | | Type | Counter ion | Acid value | Mw | Diol compound | Image density | Rub resistance | Texture |
| Reference Data 2 | Excimer | 50 mW/cm² | 2 seconds | Film | Acryl | NEt₃ | 48 | 100,000 | — | C | D | C |
| Reference Data 3 | None | — | — | Film | Urethane | NEt₃ | 48 | 100,000 | Hexanediol polycarbonate Mn = 2,000 | D | D | A |
| Reference Data 4 | Corona | 5 kV * at a treatment voltage | 2 seconds | Film | Urethane | NEt₃ | 48 | 100,000 | Hexanediol polycarbonate Mn = 2,000 | B | B | D |
| Reference Data 5 | Metal halide mercury | 50 mW/cm² | 2 seconds | Film | Urethane | NEt₃ | 48 | 100,000 | Hexanediol polycarbonate Mn = 2,000 | C | D | B |

TABLE 2

| | Pretreatment | Illuminance | Irradiation time | Substrate | Configuration of polymer particles | | | | Evaluation | | |
|---|---|---|---|---|---|---|---|---|---|---|---|
| | | | | | Type | Counter ion | Acid value | Mw | Diol compound | Image density | Rub resistance | Texture |
| Example 1 | Excimer | 50 mW/cm² | 2 seconds | Non-woven fabric | Urethane | NEt₃ | 48 | 100,000 | Hexanediol polycarbonate Mn = 2,000 | A | A | A |
| Example 2 | Excimer | 50 mW/cm² | 2 seconds | Non-woven fabric | Urethane | NBu₃ | 48 | 100,000 | Hexanediol polycarbonate Mn = 2,000 | A | A | A |
| Example 3 | Excimer | 50 mW/cm² | 2 seconds | Non-woven fabric | Urethane | Pyridine | 48 | | | | | |
| Example 4 | Excimer | 50 mW/cm² | 2 seconds | Non-woven fabric | Urethane | Morpholine | 48 | | | | | |
| Example 5 | Excimer | 50 mW/cm² | 2 seconds | Non-woven fabric | Urethane | DMAP | 48 | | | | | |
| Example 6 | Excimer | 50 mW/cm² | 2 seconds | Non-woven fabric | Acryl | NEt₃ | 48 | | | | | |
| Example 7 | Excimer | 50 mW/cm² | 2 seconds | Non-woven fabric | Acryl | Na | 48 | | | | | |
| Example 8 | Excimer | 50 mW/cm² | 2 seconds | Non-woven fabric | Urethane | NEt₃ | 48 | | | | | |
| Example 9 | Excimer | 50 mW/cm² | 2 seconds | Non-woven fabric | Urethane | NEt₃ | 48 | | | | | |
| Example 10 | Excimer | 50 mW/cm² | 2 seconds | Non-woven fabric | Urethane | NEt₃ | 48 | | | | | |
| Example 11 | Excimer | 50 mW/cm² | 2 seconds | Non-woven fabric | Urethane | NEt₃ | 48 | | | | | |
| Example 12 | Excimer | 50 mW/cm² | 2 seconds | Non-woven fabric | Urethane | NEt₃ | 48 | | | | | |
| Example 13 | Excimer | 50 mW/cm² | 2 seconds | Non-woven fabric | Urethane | NEt₃ | 48 | | | | | |
| Example 14 | Excimer | 50 mW/cm² | 2 seconds | Non-woven fabric | Urethane | NEt₃ | 48 | | | | | |
| Example 15 | Excimer | 50 mW/cm² | 2 seconds | Non-woven fabric | Urethane | NEt₃ | 48 | | | | | |
| Example 16 | Excimer | 50 mW/cm² | 2 seconds | Non-woven fabric | Urethane | NEt₃ | 48 | | | | | |
| Example 17 | Excimer | 50 mW/cm² | 2 seconds | Non-woven fabric | Urethane | NEt₃ | 100 | | | | | |
| Example 18 | Excimer | 50 mW/cm² | 2 seconds | Non-woven fabric | Urethane | NEt₃ | 200 | | | | | |
| Example 19 | Excimer | 50 mW/cm² | 2 seconds | Non-woven fabric | Urethane | NEt₃ | 280 | | | | | |
| Example 20 | Excimer | 50 mW/cm² | 2 seconds | Non-woven fabric | Urethane | Na | 48 | | | | | |
| Example 21 | Excimer | 50 mW/cm² | 2 seconds | Non-woven fabric | Urethane | K | 48 | | | | | |

TABLE 2-continued

| | | | | | |
|---|---|---|---|---|---|
| Example 3 | 100,000 | Hexanediol polycarbonate Mn = 2,000 | A | A | A |
| Example 4 | 100,000 | Hexanediol polycarbonate Mn = 2,000 | A | A | A |
| Example 5 | 100,000 | Hexanediol polycarbonate Mn = 2,000 | A | A | A |
| Example 6 | 100,000 | — | B | B | C |
| Example 7 | 100,000 | — | B | B | C |
| Example 8 | 100,000 | Hexanediol polycarbonate Mn = 200 | B | B | C |
| Example 9 | 100,000 | Hexanediol polycarbonate Mn = 500 | A | A | B |
| Example 10 | 100,000 | Hexanediol polycarbonate Mn = 20,000 | A | B | A |
| Example 11 | 100,000 | Hexanediol polycarbonate Mn = 25,000 | B | C | B |
| Example 12 | 100,000 | Polycaprolactonediol Mn = 500 | A | A | B |
| Example 13 | 100,000 | Polycaprolactonediol Mn = 2,000 | A | A | A |
| Example 14 | 100,000 | Polycaprolactonediol Mn = 20,000 | A | B | A |
| Example 15 | 100,000 | Polypropylene glycol Mn = 2,000 | A | A | A |
| Example 16 | 100,000 | Polytetramethylene glycol Mn = 2,000 | A | A | A |
| Example 17 | 100,000 | Hexanediol polycarbonate Mn = 2,000 | A | A | A |
| Example 18 | 100,000 | Hexanediol polycarbonate Mn = 2,000 | A | B | A |
| Example 19 | 100,000 | Hexanediol polycarbonate Mn = 2,000 | A | C | A |
| Example 20 | 100,000 | Hexanediol polycarbonate Mn = 2,000 | B | C | B |
| Example 21 | 100,000 | Hexanediol polycarbonate Mn = 2,000 | B | C | B |

TABLE 3

| | | | | | Configuration of polymer particles | | | | | Evaluation | | |
|---|---|---|---|---|---|---|---|---|---|---|---|---|
| | Pre-treatment | Illuminance | Irradiation time | Substrate | Type | Counter ion | Acid value | Mw | Diol compound | Image density | Rub resistance | Texture |
| Example 22 | Excimer | 10 mW/cm$^2$ | 2 seconds | Non-woven fabric | Urethane | NEt$_3$ | 48 | 100,000 | Hexanediol polycarbonate Mn = 2,000 | A | B | A |
| Example 23 | Excimer | 30 mW/cm$^2$ | 2 seconds | Non-woven fabric | Urethane | NEt$_3$ | 48 | 100,000 | Hexanediol polycarbonate Mn = 2,000 | A | A | A |
| Example 24 | Excimer | 200 mW/cm$^2$ | 2 seconds | Non-woven fabric | Urethane | NEt$_3$ | 48 | 100,000 | Hexanediol polycarbonate Mn = 2,000 | A | A | A |
| Example 25 | Excimer | 500 mW/cm$^2$ | 2 seconds | Non-woven fabric | Urethane | NEt$_3$ | 48 | 100,000 | Hexanediol polycarbonate Mn = 2,000 | A | A | C |
| Example 26 | Excimer | 50 mW/cm$^2$ | 0.01 seconds | Non-woven fabric | Urethane | NEt$_3$ | 48 | 100,000 | Hexanediol polycarbonate Mn = 2,000 | A | C | A |
| Example 27 | Excimer | 50 mW/cm$^2$ | 0.1 seconds | Non-woven fabric | Urethane | NEt$_3$ | 48 | 100,000 | Hexanediol polycarbonate Mn = 2,000 | A | A | A |
| Example 28 | Excimer | 50 mW/cm$^2$ | 5 seconds | Non-woven fabric | Urethane | NEt$_3$ | 48 | 100,000 | Hexanediol polycarbonate Mn = 2,000 | A | A | A |
| Example 29 | Excimer | 50 mW/cm$^2$ | 10 seconds | Non-woven fabric | Urethane | NEt$_3$ | 48 | 100,000 | Hexanediol polycarbonate Mn = 2,000 | A | A | C |

From the results of Table 1, it was found that by subjecting the non-woven fabric to a pretreatment by irradiation with light from excimer emission, both the rub resistance and the texture of an image recorded by applying an ink onto the pretreated non-woven fabric can be improved.

From the results of Table 2, it was found that the rub resistance and the texture of the image recorded on the non-woven fabric are improved by incorporating the ink with a diol compound having a suitable molecular weight, and a urethane-based resin having a suitable acid value and a suitable counter ion which is formed into a latex.

From the results of Table 3, it was found that a suitable irradiation time with light from excimer emission is important for both the rub resistance and the texture of the image recorded on the non-woven fabric.

Furthermore, in a case of using the film as a recording substrate, the corona treatment is poorer than the pretreatment by irradiation with light from excimer emission in terms of the image density and the rub resistance of an image, whereas in a case of using as non-woven fabric as a recording substrate, the corona treatment is poorer than the pretreatment by irradiation with light from excimer emission in terms of the image density and the rub resistance of an image.

From the above results, it is suggested that excellent effects on the rub resistance of an image, an image density, and the texture of the image are exerted through a combination of pretreatment of a recording substrate by irradiation with light from excimer emission, and use of a non-woven fabric as a recording substrate.

Examples 30 to 58

After obtaining the image sample in "1. Image Recording" in Examples 1 to 29, the print head of Polaris PQ used for the image recording was covered with a cloth that had been immersed in each of the maintenance liquids (maintenance liquids 1 to 8) shown in Tables 4 and 5 below, and left to stand in an environment of a temperature of 25° C. for 3 days.

After being left for 3 days, an image sample was manufactured again by the same method as in "1. Image Recording" above, and there was no interference with the jettability of the ink, and the same image sample as that before being left to stand could be obtained.

TABLE 4

Composition of Maintenance Liquid

| Compound name | Trade name | Maintenance liquid 1 | Maintenance liquid 2 | Maintenance liquid 3 | [% by mass] Maintenance liquid 4 |
|---|---|---|---|---|---|
| 2-Pyrrolidone | 2-PIROL | 13.51 | 13.51 | 13.51 | 13.51 |
| 2-Methylpropane-1,3-diol | MP Diol Glycol | 7.15 | 7.15 | 7.15 | 7.15 |
| Tripropylene glycol monomethyl ether | MFTG | 20.66 | 20.66 | 20.66 | 20.66 |
| Dipropylene glycol | DPG | 0.00 | 0.00 | 0.00 | 0.00 |
|  | OLFINE E1010 | 1.00 | 0.00 | 1.00 | 0.00 |
| 2,4,7,9-Tetramethyldec-5-yne-4,7-diol | SURFYNOL 104A | 0.00 | 0.00 | 0.00 | 0.00 |
|  | BYK-024 | 0.10 | 0.10 | 0.00 | 0.10 |
| Water | Water | 57.58 | 58.58 | 57.68 | 58.58 |
| Total amount |  | 100.00 | 100.00 | 100.00 | 100.00 |

TABLE 5

Composition of Maintenance Liquid

| Compound name | Trade name | Maintenance liquid 5 | Maintenance liquid 6 | Maintenance liquid 7 | [% by mass] Maintenance liquid 8 |
|---|---|---|---|---|---|
| 2-Pyrrolidone | 2-PIROL | 0.00 | 0.00 | 0.00 | 0.00 |
| 2-Methylpropane-1,3-diol | MP Diol Glycol | 0.00 | 0.00 | 0.00 | 0.00 |
| Tripropylene glycol monomethyl ether | MFTG | 0.00 | 0.00 | 0.00 | 0.00 |
| Dipropylene glycol | DPG | 32.00 | 32.00 | 32.00 | 32.00 |
|  | OLFINE E1010 | 0.00 | 0.00 | 0.00 | 0.00 |
| 2,4,7,9-Tetramethyldec-5-yne-4,7-diol | SURFYNOL 104A | 0.40 | 0.00 | 0.40 | 0.00 |
|  | BYK-024 | 0.10 | 0.10 | 0.00 | 0.00 |
| Water | Water | 67.50 | 67.90 | 67.60 | 68.00 |
| Total amount |  | 100.00 | 100.00 | 100.00 | 100.00 |

The details of the components in Tables 4 and 5 are as follows.

2-PYROL: Manufactured by Ashland Inc.

MPDiol Glycol: Manufactured by Lyondell Chemical Company

MFTG: Manufactured by Nippon Nyukazai Co., Ltd.

DPG: Manufactured by ADEKA Corporation

OLFINE E1010: Acetylene glycol-based surfactant manufactured by Nissin Chemical Co., Ltd SURFYNOL 104A: Acetylene glycol-based surfactant manufactured by Air Products and Chemicals Inc.

BYK-024: Silicone-based anti-foaming agent manufactured by BYK-Chemie Japan K. K.

The disclosures of Japanese Patent Application 2014-225616 filed on Nov. 5, 2014 and Japanese Patent Application 2015-103945 filed on May 21, 2015 are herein incorporated by reference in their entireties.

All documents, patent applications, and technical standards described in the present specification are herein incorporated by reference to the same extent as if such individual document, patent application, and technical standard were specifically and individually indicated to be herein incorporated by reference.

What is claimed is:

1. An image recording method, comprising:
   subjecting a recording substrate to a surface treatment by irradiating an image recording surface of the recording substrate with light from excimer emission using a xenon gas, the recording substrate comprising an aggregate of non-absorbent or low absorbent fiber materials; and
   applying an ink composition by an ink jet method onto the image recording surface of the recording substrate after the surface treatment,
   wherein the fiber materials comprise at least one selected from the group consisting of polypropylene fibers and polyethylene fibers, and
   wherein the aggregate is a non-woven fabric.

2. The image recording method according to claim 1, wherein an irradiation intensity of the light is 30 mW/cm$^2$ to 300 mW/cm$^2$.

3. The image recording method according to claim 1, wherein irradiation time of the light is 0.1 seconds to 10 seconds.

4. The image recording method according to claim 1, wherein the ink composition comprises a color material and water.

5. The image recording method according to claim 4, wherein the color material comprises a pigment.

6. The image recording method according to claim 1, wherein the ink composition further comprises particles of a urethane-based resin.

7. The image recording method according to claim 6, wherein the urethane-based resin comprises an organic salt having an organic cation as a counter ion.

8. The image recording method according to claim 7, wherein the organic salt comprises a triethylamine salt having a triethylamine cation as a counter ion.

9. The image recording method according to claim 6, wherein the urethane-based resin comprises a structure derived from a diisocyanate compound, a structure derived from a diol compound, and a structure derived from an organic salt of a carboxyl group-containing diol compound.

10. The image recording method according to claim 9, wherein the diol compound comprises a diol polycarbonate.

11. The image recording method according to claim 9, wherein the diol compound has a molecular weight of from 500 to 20,000.

12. The image recording method according to claim 6, wherein the urethane-based resin has an acid value of from 10 mmol/g to 200 mmol/g.

* * * * *